US012674676B2

(12) United States Patent
Brush et al.

(10) Patent No.: US 12,674,676 B2
(45) Date of Patent: **\*Jul. 7, 2026**

(54) MOBILE SEARCH BASED ON PREDICTED LOCATION

(71) Applicant: Uber Technologies, Inc., San Francisco, CA (US)

(72) Inventors: Alice Jane Bernheim Brush, Redmond, WA (US); John Charles Krumm, Redmond, WA (US); Shahriyar Amini, Waltham, MA (US); Amy Karlson, Bellevue, WA (US); Jaime Teevan, Bellevue, WA (US); Nissanka Arachchige Bodhi Priyantha, Redmond, WA (US)

(73) Assignee: Uber Technologies, Inc., San Francisco, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 18/790,291

(22) Filed: Jul. 31, 2024

(65) Prior Publication Data

US 2024/0393127 A1 Nov. 28, 2024

Related U.S. Application Data

(63) Continuation of application No. 18/159,792, filed on Jan. 26, 2023, now Pat. No. 12,078,501, which is a
(Continued)

(51) Int. Cl.
*H04W 4/029* (2018.01)
*G01C 21/34* (2006.01)
(Continued)

(52) U.S. Cl.
CPC ..... *G01C 21/3617* (2013.01); *G01C 21/3476* (2013.01); *G01C 21/3484* (2013.01);
(Continued)

(58) Field of Classification Search
CPC ............ G01C 21/3617; G01C 21/3476; G01C 21/3484; G01C 21/3492; G01C 21/362; G06F 16/24575; G06F 16/248
See application file for complete search history.

(56) References Cited

U.S. PATENT DOCUMENTS 4,760,530 A 7/1988 Liden
5,493,692 A 2/1996 Theimer et al.
(Continued)

FOREIGN PATENT DOCUMENTS

CN 1280438 A 1/2001
CN 1609793 A 4/2005
(Continued)

OTHER PUBLICATIONS

"About Project Playlist", [Online] Retrieved from the Internet : <http://www.playlist.com/static/node/491.html> on May 16, 2008, (Apr. 9, 2008), 3 pgs.
(Continued)

*Primary Examiner* — Tan Q Nguyen
(74) *Attorney, Agent, or Firm* — Schwegman Lundberg & Woessner, P.A.

(57) ABSTRACT

A method includes receiving one or more search terms at a mobile computing device while the mobile computing device is located at a particular location. A search query that includes the one or more search terms and a location history of the mobile computing device is transmitted to a server. The method also includes receiving one or more search results in response to the search query, where the one or more search results include content identified based on a predicted destination of the mobile computing device. An interface identifying the one or more search results is displayed at the mobile computing device.

18 Claims, 8 Drawing Sheets

Related U.S. Application Data continuation of application No. 17/248,578, filed on Jan. 29, 2021, now Pat. No. 11,614,336, which is a continuation of application No. 16/015,630, filed on Jun. 22, 2018, now Pat. No. 10,935,389, which is a continuation of application No. 14/820,423, filed on Aug. 6, 2015, now Pat. No. 10,030,988, which is a continuation of application No. 12/970,974, filed on Dec. 17, 2010, now Pat. No. 9,134,137.

(51) Int. Cl.

| | |
|---|---|
| *G01C 21/36* | (2006.01) |
| *G06F 16/2457* | (2019.01) |
| *G06F 16/248* | (2019.01) |
| *G06F 16/29* | (2019.01) |
| *G06F 16/9535* | (2019.01) |
| *G06F 16/9537* | (2019.01) |
| *H04W 4/02* | (2018.01) |

(52) U.S. Cl.

CPC ....... *G01C 21/3492* (2013.01); *G01C 21/362* (2013.01); *G01C 21/3673* (2013.01); *G06F 16/24575* (2019.01); *G06F 16/248* (2019.01); *G06F 16/29* (2019.01); *G06F 16/9535* (2019.01); *G06F 16/9537* (2019.01); *H04W 4/02* (2013.01); *H04W 4/029* (2018.02)

(56) References Cited

U.S. PATENT DOCUMENTS

| | | | |
|---|---|---|---|
| 5,544,321 | A | 8/1996 | Theimer et al. |
| 5,555,376 | A | 9/1996 | Theimer et al. |
| 5,603,054 | A | 2/1997 | Theimer et al. |
| 5,611,050 | A | 3/1997 | Theimer et al. |
| 5,623,194 | A | 4/1997 | Boll et al. |
| 5,781,704 | A | 7/1998 | Rossmo |
| 5,812,865 | A | 9/1998 | Theimer et al. |
| 5,845,227 | A | 12/1998 | Peterson |
| 5,848,395 | A | 12/1998 | Edgar et al. |
| 5,948,040 | A | 9/1999 | DeLorme et al. |
| 5,978,732 | A | 11/1999 | Kakitani et al. |
| 6,078,826 | A | 6/2000 | Croft et al. |
| 6,084,543 | A | 7/2000 | Iizuka |
| 6,092,014 | A | 7/2000 | Okada |
| 6,116,363 | A | 9/2000 | Frank |
| 6,119,065 | A | 9/2000 | Shimada et al. |
| 6,122,572 | A | 9/2000 | Yavnai |
| 6,154,745 | A | 11/2000 | Kari et al. |
| 6,292,687 | B1 | 9/2001 | Lowell et al. |
| 6,298,304 | B1 | 10/2001 | Theimer |
| 6,314,347 | B1 | 11/2001 | Kuroda et al. |
| 6,317,718 | B1 | 11/2001 | Fano |
| 6,321,161 | B1 | 11/2001 | Herbst et al. |
| 6,353,398 | B1 | 3/2002 | Amin et al. |
| 6,356,905 | B1 | 3/2002 | Gershman et al. |
| 6,381,522 | B1 | 4/2002 | Watanabe et al. |
| 6,401,085 | B1 | 6/2002 | Gershman et al. |
| 6,405,134 | B1 | 6/2002 | Smith et al. |
| 6,418,424 | B1 | 7/2002 | Hoffberg et al. |
| 6,446,076 | B1 | 9/2002 | Burkey et al. |
| 6,466,232 | B1 | 10/2002 | Newell et al. |
| 6,480,783 | B1 | 11/2002 | Myr |
| 6,490,519 | B1 | 12/2002 | Lapidot et al. |
| 6,513,046 | B1 | 1/2003 | Abbott, III et al. |
| 6,526,350 | B2 | 2/2003 | Sekiyama |
| 6,549,915 | B2 | 4/2003 | Abbott, III et al. |
| 6,564,213 | B1 | 5/2003 | Ortega et al. |
| 6,574,351 | B1 | 6/2003 | Miyano |
| 6,587,785 | B2 | 7/2003 | Jijina et al. |
| 6,603,405 | B2 | 8/2003 | Smith |
| 6,611,754 | B2 | 8/2003 | Klein |
| 6,615,130 | B2 | 9/2003 | Myr |
| 6,618,593 | B1 | 9/2003 | Drutman et al. |
| 6,622,160 | B1 | 9/2003 | Horvitz |
| 6,668,227 | B2 | 12/2003 | Hamada et al. |
| 6,672,506 | B2 | 1/2004 | Swartz et al. |
| 6,700,504 | B1 | 3/2004 | Aslandogan et al. |
| 6,714,967 | B1 | 3/2004 | Horvitz |
| 6,741,188 | B1 | 5/2004 | Miller et al. |
| 6,747,675 | B1 | 6/2004 | Abbott et al. |
| D494,584 | S | 8/2004 | Schlieffers et al. |
| 6,791,580 | B1 | 9/2004 | Abbott et al. |
| 6,796,505 | B2 | 9/2004 | Pellaumail et al. |
| 6,801,223 | B1 | 10/2004 | Abbott et al. |
| 6,807,483 | B1 | 10/2004 | Chao et al. |
| 6,812,937 | B1 | 11/2004 | Abbott et al. |
| 6,837,436 | B2 | 1/2005 | Swartz et al. |
| 6,842,877 | B2 | 1/2005 | Robarts et al. |
| 6,845,324 | B2 | 1/2005 | Smith |
| 6,845,370 | B2 | 1/2005 | Burkey et al. |
| RE38,724 | E | 4/2005 | Peterson |
| 6,889,382 | B1 | 5/2005 | Anderson |
| 6,892,196 | B1 | 5/2005 | Hughes |
| 6,931,598 | B2 | 8/2005 | Price et al. |
| 6,954,735 | B1 | 10/2005 | Djupsjöbacka et al. |
| 7,010,501 | B1 | 3/2006 | Roslak et al. |
| 7,040,541 | B2 | 5/2006 | Swartz et al. |
| 7,054,938 | B2 | 5/2006 | Sundqvist et al. |
| 7,058,506 | B2 | 6/2006 | Kawase et al. |
| 7,063,263 | B2 | 6/2006 | Swartz et al. |
| 7,069,310 | B1 | 6/2006 | Bartholomew |
| 7,071,842 | B1 | 7/2006 | Brady, Jr. |
| 7,103,470 | B2 | 9/2006 | Mintz |
| 7,130,743 | B2 | 10/2006 | Kudo et al. |
| 7,149,741 | B2 | 12/2006 | Burkey et al. |
| 7,171,378 | B2 | 1/2007 | Petrovich et al. |
| 7,195,157 | B2 | 3/2007 | Swartz et al. |
| 7,200,394 | B2 | 4/2007 | Aoki et al. |
| 7,200,566 | B1 | 4/2007 | Moore et al. |
| 7,227,498 | B2 | 6/2007 | Soliman |
| 7,233,861 | B2 | 6/2007 | Van Buer et al. |
| 7,245,925 | B2 | 7/2007 | Zellner |
| 7,246,007 | B2 | 7/2007 | Ferman |
| 7,385,501 | B2 | 6/2008 | Miller et al. |
| 7,386,477 | B2 | 6/2008 | Fano |
| 7,389,179 | B2 | 6/2008 | Jin et al. |
| 7,403,774 | B2 | 7/2008 | Chandra et al. |
| 7,451,041 | B2 | 11/2008 | Laumeyer et al. |
| 7,463,890 | B2 | 12/2008 | Herz et al. |
| 7,512,462 | B2 | 3/2009 | Nichols et al. |
| 7,536,258 | B2 | 5/2009 | Kudo et al. |
| 7,565,157 | B1 | 7/2009 | Ortega et al. |
| 7,577,522 | B2 | 8/2009 | Rosenberg |
| 7,589,628 | B1 | 9/2009 | Brady, Jr. |
| 7,590,589 | B2 | 9/2009 | Hoffberg |
| 7,596,513 | B2 | 9/2009 | Fargo |
| 7,603,229 | B2 | 10/2009 | Goldberg et al. |
| 7,610,151 | B2 | 10/2009 | Letchner et al. |
| 7,617,042 | B2 | 11/2009 | Horvitz et al. |
| 7,630,828 | B2 | 12/2009 | Tajima et al. |
| 7,630,986 | B1 | 12/2009 | Herz et al. |
| 7,634,463 | B1 | 12/2009 | Katragadda et al. |
| 7,636,707 | B2 | 12/2009 | Chaudhuri et al. |
| 7,676,583 | B2 | 3/2010 | Eaton et al. |
| 7,698,055 | B2 | 4/2010 | Horvitz et al. |
| 7,706,964 | B2 | 4/2010 | Horvitz et al. |
| 7,720,715 | B1 | 5/2010 | Nemer |
| 7,739,040 | B2 | 6/2010 | Horvitz |
| 7,743,048 | B2 | 6/2010 | Baldwin |
| 7,743,056 | B2 | 6/2010 | Meisels et al. |
| 7,774,002 | B1 | 8/2010 | Ortega et al. |
| 7,774,003 | B1 | 8/2010 | Ortega et al. |
| 7,783,423 | B2 | 8/2010 | Verma et al. |
| 7,788,030 | B2 | 8/2010 | Kato et al. |
| 7,797,267 | B2 | 9/2010 | Horvitz |
| 7,813,870 | B2 | 10/2010 | Downs et al. |
| 7,835,859 | B2 | 11/2010 | Bill |
| 7,835,939 | B1 | 11/2010 | Karlsson |
| 7,885,761 | B2 | 2/2011 | Tajima et al. |
| 7,899,611 | B2 | 3/2011 | Downs et al. |
| 7,912,628 | B2 | 3/2011 | Chapman et al. |
| 7,912,637 | B2 | 3/2011 | Horvitz et al. |

(56)          References Cited

U.S. PATENT DOCUMENTS

| | | |
|---|---|---|
| 7,925,426 B2 | 4/2011 | Koebler et al. |
| 7,941,269 B2 | 5/2011 | Laumeyer et al. |
| 7,962,156 B2 | 6/2011 | Robertson et al. |
| 7,991,718 B2 | 8/2011 | Horvitz et al. |
| 8,005,822 B2 | 8/2011 | Rechis et al. |
| 8,020,104 B2 | 9/2011 | Robarts et al. |
| 8,024,112 B2 | 9/2011 | Krumm et al. |
| 8,027,788 B2 | 9/2011 | Miyata |
| 8,090,530 B2 | 1/2012 | Horvitz |
| 8,121,891 B2 | 2/2012 | Handel et al. |
| 8,126,641 B2 | 2/2012 | Horvitz |
| 8,131,467 B2 | 3/2012 | Yoshioka et al. |
| 8,165,773 B1 | 4/2012 | Chavez et al. |
| 8,166,028 B1 | 4/2012 | Reynar et al. |
| 8,166,392 B2 | 4/2012 | Horvitz |
| 8,190,362 B2 | 5/2012 | Barker et al. |
| 8,275,546 B2 | 9/2012 | Xiao et al. |
| 8,370,062 B1 * | 2/2013 | Starenky ............... H04W 4/21 |
| | | 463/16 |
| 8,473,197 B2 | 6/2013 | Horvitz |
| 8,533,097 B2 | 9/2013 | Maass |
| 8,615,254 B2 | 12/2013 | Jamtgaard et al. |
| 8,639,803 B2 | 1/2014 | Moritz et al. |
| 8,731,821 B2 * | 5/2014 | Sheynblat .......... G01C 21/3679 |
| | | 701/425 |
| 8,754,777 B1 | 6/2014 | Mendis |
| 8,930,391 B2 | 1/2015 | Chakrabarti et al. |
| 8,981,995 B2 | 3/2015 | Schlesinger et al. |
| 9,134,137 B2 | 9/2015 | Brush et al. |
| 9,163,952 B2 | 10/2015 | Viola et al. |
| 10,030,988 B2 | 7/2018 | Brush et al. |
| 10,049,166 B2 | 8/2018 | Sood et al. |
| 10,191,991 B2 | 1/2019 | Kasterstein et al. |
| 10,474,719 B2 | 11/2019 | Touma et al. |
| 10,935,389 B2 | 3/2021 | Brush et al. |
| 11,614,336 B2 | 3/2023 | Brush et al. |
| 11,814,336 B2 | 11/2023 | Brocas et al. |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2001/0055165 A1 | 12/2001 | Mccarthy et al. |
| 2002/0002504 A1 | 1/2002 | Engel et al. |
| 2002/0032689 A1 | 3/2002 | Kenneth, III et al. |
| 2002/0044152 A1 | 4/2002 | Kenneth, III et al. |
| 2002/0052786 A1 | 5/2002 | Kim et al. |
| 2002/0052930 A1 | 5/2002 | Abbott et al. |
| 2002/0052963 A1 | 5/2002 | Abbott et al. |
| 2002/0054130 A1 | 5/2002 | Kenneth, III et al. |
| 2002/0054174 A1 | 5/2002 | Abbott et al. |
| 2002/0067289 A1 | 6/2002 | Smith |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0107618 A1 | 8/2002 | Deguchi et al. |
| 2002/0194061 A1 | 12/2002 | Himmel et al. |
| 2003/0036842 A1 | 2/2003 | Hancock |
| 2003/0042051 A1 | 3/2003 | Kriger |
| 2003/0046401 A1 | 3/2003 | Abbott et al. |
| 2003/0069683 A1 | 4/2003 | Lapidot et al. |
| 2003/0135304 A1 | 7/2003 | Sroub et al. |
| 2003/0135582 A1 | 7/2003 | Allen et al. |
| 2003/0139863 A1 | 7/2003 | Toda et al. |
| 2003/0153338 A1 | 8/2003 | Herz et al. |
| 2003/0154009 A1 | 8/2003 | Basir et al. |
| 2003/0154476 A1 | 8/2003 | Kenneth, III et al. |
| 2003/0172368 A1 | 9/2003 | Alumbaugh et al. |
| 2003/0195700 A1 | 10/2003 | Hamada et al. |
| 2003/0229471 A1 | 12/2003 | Guralnik et al. |
| 2003/0229895 A1 | 12/2003 | Jasinschi et al. |
| 2004/0015557 A1 | 1/2004 | Horvitz |
| 2004/0017392 A1 | 1/2004 | Welch |
| 2004/0019603 A1 | 1/2004 | Haigh et al. |
| 2004/0068364 A1 | 4/2004 | Zhao et al. |
| 2004/0070602 A1 | 4/2004 | Kobuya et al. |
| 2004/0090121 A1 | 5/2004 | Simonds et al. |
| 2004/0090346 A1 | 5/2004 | Simonds et al. |
| 2004/0092253 A1 | 5/2004 | Simonds et al. |
| 2004/0093154 A1 | 5/2004 | Simonds et al. |
| 2004/0093155 A1 | 5/2004 | Simonds et al. |
| 2004/0125144 A1 | 7/2004 | Yoon |
| 2004/0128066 A1 | 7/2004 | Kudo et al. |
| 2004/0153445 A1 | 8/2004 | Horvitz et al. |
| 2004/0166877 A1 | 8/2004 | Spain, Jr. et al. |
| 2004/0172457 A1 | 9/2004 | Horvitz |
| 2004/0172483 A1 | 9/2004 | Horvitz |
| 2004/0176211 A1 | 9/2004 | Kitajima et al. |
| 2004/0180671 A1 | 9/2004 | Spain, Jr. |
| 2004/0181340 A1 | 9/2004 | Smith |
| 2004/0189475 A1 | 9/2004 | Cooper et al. |
| 2004/0201500 A1 | 10/2004 | Miller et al. |
| 2004/0260457 A1 | 12/2004 | Kawase et al. |
| 2004/0267965 A1 | 12/2004 | Vasudevan et al. |
| 2004/0268403 A1 | 12/2004 | Krieger et al. |
| 2005/0021417 A1 | 1/2005 | Kassan |
| 2005/0034078 A1 | 2/2005 | Abbott et al. |
| 2005/0046584 A1 | 3/2005 | Breed |
| 2005/0049900 A1 | 3/2005 | Hirose et al. |
| 2005/0086004 A1 | 4/2005 | Smith |
| 2005/0091118 A1 | 4/2005 | Fano |
| 2005/0097005 A1 | 5/2005 | Fargo |
| 2005/0125148 A1 | 6/2005 | Van Buer et al. |
| 2005/0131607 A1 | 6/2005 | Breed |
| 2005/0144318 A1 | 6/2005 | Chang |
| 2005/0149253 A1 | 7/2005 | Nambata |
| 2005/0182645 A1 | 8/2005 | Ehlis et al. |
| 2005/0197775 A1 | 9/2005 | Smith |
| 2005/0216186 A1 | 9/2005 | Dorfman et al. |
| 2005/0219120 A1 | 10/2005 | Chang |
| 2005/0228553 A1 | 10/2005 | Tryon |
| 2005/0240378 A1 | 10/2005 | Smith et al. |
| 2005/0256866 A1 | 11/2005 | Lu et al. |
| 2005/0266858 A1 | 12/2005 | Miller et al. |
| 2005/0272442 A1 | 12/2005 | Miller et al. |
| 2005/0278114 A1 | 12/2005 | Ahmad |
| 2005/0283503 A1 | 12/2005 | Hancock et al. |
| 2006/0015254 A1 | 1/2006 | Smith |
| 2006/0019676 A1 | 1/2006 | Miller et al. |
| 2006/0022048 A1 | 2/2006 | Johnson |
| 2006/0026147 A1 | 2/2006 | Cone et al. |
| 2006/0047416 A1 | 3/2006 | Goldberg et al. |
| 2006/0070012 A1 | 3/2006 | Milener et al. |
| 2006/0138219 A1 | 6/2006 | Brzezniak et al. |
| 2006/0146834 A1 | 7/2006 | Baker et al. |
| 2006/0195789 A1 | 8/2006 | Rogers et al. |
| 2006/0241862 A1 | 10/2006 | Chihara et al. |
| 2006/0271277 A1 | 11/2006 | Hu et al. |
| 2006/0271286 A1 | 11/2006 | Rosenberg |
| 2006/0277474 A1 | 12/2006 | Robarts et al. |
| 2006/0286988 A1 | 12/2006 | Blume et al. |
| 2006/0294084 A1 | 12/2006 | Patel et al. |
| 2007/0008927 A1 | 1/2007 | Herz et al. |
| 2007/0010942 A1 | 1/2007 | Bill |
| 2007/0011148 A1 | 1/2007 | Burkey et al. |
| 2007/0033516 A1 | 2/2007 | Khosla et al. |
| 2007/0042790 A1 | 2/2007 | Mohi et al. |
| 2007/0060108 A1 | 3/2007 | East et al. |
| 2007/0061245 A1 | 3/2007 | Ramer et al. |
| 2007/0073477 A1 | 3/2007 | Krumm et al. |
| 2007/0083497 A1 | 4/2007 | Martinez |
| 2007/0088683 A1 | 4/2007 | Feroglia et al. |
| 2007/0100801 A1 | 5/2007 | Celik et al. |
| 2007/0106465 A1 | 5/2007 | Adam et al. |
| 2007/0118279 A1 | 5/2007 | Kudo |
| 2007/0124157 A1 | 5/2007 | Laumeyer et al. |
| 2007/0129072 A1 | 6/2007 | Yamato et al. |
| 2007/0150369 A1 | 6/2007 | Zivin |
| 2007/0156334 A1 | 7/2007 | Vu |
| 2007/0162942 A1 | 7/2007 | Hamynen et al. |

(56) References Cited

U.S. PATENT DOCUMENTS

| | | |
|---|---|---|
| 2007/0208619 A1 | 9/2007 | Branam et al. |
| 2007/0208991 A1 | 9/2007 | Rider |
| 2007/0214180 A1 | 9/2007 | Crawford |
| 2007/0219706 A1 | 9/2007 | Sheynblat |
| 2007/0255621 A1 | 11/2007 | Mason |
| 2008/0004794 A1 | 1/2008 | Horvitz |
| 2008/0004802 A1 | 1/2008 | Horvitz |
| 2008/0004926 A1 | 1/2008 | Horvitz et al. |
| 2008/0005055 A1 | 1/2008 | Horvitz |
| 2008/0016055 A1 | 1/2008 | Riise et al. |
| 2008/0021628 A1 | 1/2008 | Tryon |
| 2008/0027632 A1 | 1/2008 | Mauderer |
| 2008/0033646 A1 | 2/2008 | Morgan et al. |
| 2008/0070593 A1 | 3/2008 | Altman et al. |
| 2008/0088424 A1 | 4/2008 | Imura et al. |
| 2008/0090591 A1 | 4/2008 | Miller et al. |
| 2008/0091347 A1 | 4/2008 | Tashiro |
| 2008/0091537 A1 | 4/2008 | Miller et al. |
| 2008/0104225 A1 | 5/2008 | Zhang et al. |
| 2008/0109307 A1 | 5/2008 | Ullah |
| 2008/0126191 A1 | 5/2008 | Schiavi |
| 2008/0140712 A1 | 6/2008 | Weber et al. |
| 2008/0161018 A1 | 7/2008 | Miller et al. |
| 2008/0215436 A1 | 9/2008 | Roberts |
| 2008/0243370 A1 | 10/2008 | Loera et al. |
| 2008/0247377 A1 | 10/2008 | Van Horn et al. |
| 2008/0248815 A1 | 10/2008 | Busch |
| 2008/0249667 A1 | 10/2008 | Horvitz et al. |
| 2008/0261516 A1 | 10/2008 | Robinson |
| 2008/0263036 A1 | 10/2008 | Yamamoto |
| 2008/0268870 A1 | 10/2008 | Houri |
| 2008/0275632 A1 | 11/2008 | Cummings |
| 2008/0288494 A1 | 11/2008 | Brogger et al. |
| 2008/0311947 A1 | 12/2008 | Soerensen et al. |
| 2008/0319658 A1 | 12/2008 | Horvitz et al. |
| 2008/0319660 A1 | 12/2008 | Horvitz et al. |
| 2009/0003252 A1 | 1/2009 | Salomone et al. |
| 2009/0005067 A1 | 1/2009 | Ernst et al. |
| 2009/0006297 A1 | 1/2009 | Horvitz et al. |
| 2009/0036148 A1 | 2/2009 | Yach |
| 2009/0037838 A1 | 2/2009 | Gedye et al. |
| 2009/0040954 A1 | 2/2009 | Usuba et al. |
| 2009/0125226 A1 | 5/2009 | Laumeyer et al. |
| 2009/0125380 A1 | 5/2009 | Otto et al. |
| 2009/0143082 A1 | 6/2009 | Begeja et al. |
| 2009/0174540 A1 | 7/2009 | Smith |
| 2009/0265096 A1 | 10/2009 | Haatainen et al. |
| 2009/0319672 A1 | 12/2009 | Reisman |
| 2010/0010733 A1 | 1/2010 | Frumm |
| 2010/0036601 A1 | 2/2010 | Ozawa et al. |
| 2010/0070160 A1 | 3/2010 | Haatainen et al. |
| 2010/0070171 A1 | 3/2010 | Barbeau et al. |
| 2010/0070334 A1 | 3/2010 | Monteverde |
| 2010/0082247 A1 | 4/2010 | Klein et al. |
| 2010/0082436 A1 | 4/2010 | Maghoul et al. |
| 2010/0094707 A1 | 4/2010 | Freer |
| 2010/0106603 A1 | 4/2010 | Dey et al. |
| 2010/0153007 A1 | 6/2010 | Crowley |
| 2010/0185388 A1 | 7/2010 | Horvitz |
| 2010/0188575 A1 | 7/2010 | Salomons et al. |
| 2010/0198860 A1 | 8/2010 | Burnett et al. |
| 2010/0214942 A1 | 8/2010 | Du et al. |
| 2010/0248746 A1 | 9/2010 | Saavedra et al. |
| 2010/0250348 A1 | 9/2010 | Dunbar |
| 2010/0250578 A1 | 9/2010 | Athsani et al. |
| 2010/0255856 A1 | 10/2010 | Kansal et al. |
| 2010/0305848 A1* | 12/2010 | Stallman ............ G06F 16/9537 707/E17.014 |
| 2010/0305855 A1* | 12/2010 | Dutton ................... H04L 67/04 340/8.1 |
| 2010/0306211 A1 | 12/2010 | Chaudhuri et al. |
| 2010/0317374 A1 | 12/2010 | Alpert et al. |
| 2010/0323715 A1 | 12/2010 | Winters |
| 2010/0332315 A1 | 12/2010 | Kamar et al. |
| 2010/0333137 A1 | 12/2010 | Hamano et al. |

| | | |
|---|---|---|
| 2011/0004513 A1 | 1/2011 | Hoffberg |
| 2011/0022464 A1 | 1/2011 | Dunn et al. |
| 2011/0075598 A1 | 3/2011 | Jalfon et al. |
| 2011/0085447 A1 | 4/2011 | Kholaif et al. |
| 2011/0137895 A1 | 6/2011 | Petrou et al. |
| 2011/0150107 A1 | 6/2011 | Jung et al. |
| 2011/0151839 A1 | 6/2011 | Bolon et al. |
| 2011/0208430 A1 | 8/2011 | Tun et al. |
| 2011/0219094 A1 | 9/2011 | Turakhia |
| 2011/0238289 A1 | 9/2011 | Lehmann et al. |
| 2011/0246059 A1 | 10/2011 | Tokashiki et al. |
| 2011/0282571 A1 | 11/2011 | Krumm et al. |
| 2011/0302167 A1 | 12/2011 | Vailaya |
| 2011/0313657 A1* | 12/2011 | Myllymaki ............. H04W 4/18 701/438 |
| 2011/0319094 A1 | 12/2011 | Usui et al. |
| 2012/0020522 A1 | 1/2012 | Soderstrom |
| 2012/0026992 A1 | 2/2012 | Navda et al. |
| 2012/0089322 A1 | 4/2012 | Horvitz |
| 2012/0158289 A1 | 6/2012 | Bernheim Brush et al. |
| 2012/0184323 A1 | 7/2012 | Hara |
| 2012/0299724 A1 | 11/2012 | Kuper et al. |
| 2013/0006754 A1 | 1/2013 | Horvitz et al. |
| 2013/0018581 A1 | 1/2013 | Sidhu et al. |
| 2013/0018629 A1 | 1/2013 | Sidhu et al. |
| 2013/0077546 A1 | 3/2013 | Liu et al. |
| 2013/0110454 A1 | 5/2013 | Sidhu |
| 2013/0158867 A1 | 6/2013 | Sidhu et al. |
| 2013/0195091 A1 | 8/2013 | Gibbs et al. |
| 2013/0223308 A1 | 8/2013 | Chandra et al. |
| 2014/0024354 A1 | 1/2014 | Haik et al. |
| 2014/0070991 A1 | 3/2014 | Liu et al. |
| 2015/0018008 A1 | 1/2015 | Schlesinger et al. |
| 2015/0339397 A1 | 11/2015 | Brush et al. |
| 2018/0299287 A1 | 10/2018 | Brush et al. |
| 2021/0223059 A1 | 7/2021 | Brush et al. |
| 2023/0168099 A1 | 6/2023 | Brush et al. |

FOREIGN PATENT DOCUMENTS

| | | |
|---|---|---|
| CN | 1779672 A | 5/2006 |
| CN | 1828599 A | 9/2006 |
| CN | 101164059 A | 4/2008 |
| CN | 101286173 A | 10/2008 |
| CN | 101690106 A | 3/2010 |
| DE | 10042983 A1 | 3/2002 |
| EP | 1085484 A2 | 3/2001 |
| EP | 1929456 A1 | 6/2008 |
| EP | 2114103 A2 | 11/2009 |
| EP | 2293016 A2 | 3/2011 |
| EP | 2293233 A1 | 3/2011 |
| GB | 2431261 A | 4/2007 |
| JP | 07083678 A | 3/1995 |
| JP | 08271277 A | 10/1996 |
| JP | 10132593 A | 5/1998 |
| JP | 11153446 A | 6/1999 |
| JP | 2002041612 A | 2/2002 |
| JP | 2002328035 A | 11/2002 |
| JP | 2004317160 A | 11/2004 |
| JP | 2009116472 A | 5/2009 |
| JP | 2009543191 A | 12/2009 |
| KR | 1019970071404 A | 11/1997 |
| KR | 100267540 B1 | 10/2000 |
| KR | 1020040033141 A | 4/2004 |
| KR | 1020040050550 A | 6/2004 |
| KR | 1020040078955 A | 9/2004 |
| KR | 1020050035336 A | 4/2005 |
| KR | 1020050045716 A | 5/2005 |
| KR | 1020050105139 A | 11/2005 |
| KR | 1020100072795 A | 7/2010 |
| TW | 200912781 A | 3/2009 |
| WO | WO-9800787 A1 | 1/1998 |
| WO | WO-01009753 A3 | 2/2001 |
| WO | WO-2004044605 A2 | 5/2004 |

(56)     References Cited

FOREIGN PATENT DOCUMENTS

WO      WO-2005024688 A1    3/2005
WO      WO-2007040891 A1    4/2007

OTHER PUBLICATIONS

"U.S. Appl. No. 11/426,540, Non Final Office Action mailed Apr. 6, 2010", 9 pgs.
"U.S. Appl. No. 11/426,540, Non Final Office Action mailed Sep. 3, 2009", 8 pgs.
"U.S. Appl. No. 11/426,540, Non Final Office Action mailed Oct. 14, 2010", 16 pgs.
"U.S. Appl. No. 11/426,540, Notice of Allowance mailed Apr. 15, 2011", 10 pgs.
"U.S. Appl. No. 11/426,540, Response filed Jan. 25, 2011 to Non Final Office Action mailed Oct. 14, 2010", 12 pgs.
"U.S. Appl. No. 11/426,540, Response filed Jul. 6, 2010 to Non Final Office Action mailed Apr. 6, 2010", 11 pgs.
"U.S. Appl. No. 11/426,540, Response filed Nov. 24, 2009 to Non Final Office Action mailed Sep. 3, 2009", 9 pgs.
"U.S. Appl. No. 11/428,228, Examiner Interview Summary mailed Mar. 11, 2015", 3 pgs.
"U.S. Appl. No. 11/428,228, Final Office Action mailed Jan. 14, 2014", 37 pgs.
"U.S. Appl. No. 11/428,228, Final Office Action mailed Jun. 4, 2015", 10 pgs.
"U.S. Appl. No. 11/428,228, Final Office Action mailed Nov. 18, 2010", 16 pgs.
"U.S. Appl. No. 11/428,228, Non Final Office Action mailed Jun. 8, 2010", 12 pgs.
"U.S. Appl. No. 11/428,228, Non Final Office Action mailed Aug. 14, 2013", 28 pgs.
"U.S. Appl. No. 11/428,228, Non Final Office Action mailed Sep. 24, 2014", 33 pgs.
"U.S. Appl. No. 11/428,228, Response filed Feb. 18, 2011 to Final Office Action mailed Nov. 18, 2010", 11 pgs.
"U.S. Appl. No. 11/428,228, Response filed Mar. 23, 2015 to Non Final Office Action mailed Sep. 24, 2014", 16 pgs.
"U.S. Appl. No. 11/428,228, Response filed Apr. 14, 2014 to Final Office Action mailed Jan. 14, 2014", 13 pgs.
"U.S. Appl. No. 11/428,228, Response filed May 6, 2010 to Restriction Requirement mailed Apr. 7, 2010", 2 pgs.
"U.S. Appl. No. 11/428,228, Response filed Sep. 8, 2010 to Non Final Office Action mailed Jun. 8, 2010", 9 pgs.
"U.S. Appl. No. 11/428,228, Response filed Dec. 16, 2013 to Non Final Office Action mailed Aug. 14, 2013", 14 pgs.
"U.S. Appl. No. 11/428,228, Restriction Requirement mailed Apr. 7, 2010", 8 pgs.
"U.S. Appl. No. 12/170,068, Examiner Interview Summary mailed Nov. 19, 2014", 3 pgs.
"U.S. Appl. No. 12/170,068, Final Office Action mailed May 4, 2017", 12 pgs.
"U.S. Appl. No. 12/170,068, Final Office Action mailed May 12, 2015", 14 pgs.
"U.S. Appl. No. 12/170,068, Final Office Action mailed Jun. 16, 2016", 9 pgs.
"U.S. Appl. No. 12/170,068, Final Office Action mailed Aug. 2, 2012", 8 Pgs.
"U.S. Appl. No. 12/170,068, Non Final Office Action mailed Aug. 13, 2014", 9 pgs.
"U.S. Appl. No. 12/170,068, Non Final Office Action mailed Nov. 17, 2016", 9 pgs.
"U.S. Appl. No. 12/170,068, Non Final Office Action mailed Nov. 20, 2015", 15 pgs.
"U.S. Appl. No. 12/170,068, Non Final Office Action mailed Nov. 29, 2011", 7 pgs.
"U.S. Appl. No. 12/170,068, Non Final Office Action mailed Dec. 20, 2013", 9 pgs.

"U.S. Appl. No. 12/170,068, Notice of Allowance mailed Aug. 17, 2017", 8 pgs.
"U.S. Appl. No. 12/170,068, Response filed Feb. 7, 2017 to Non Final Office Action mailed Nov. 17, 2016", 16 pgs.
"U.S. Appl. No. 12/170,068, Response filed Feb. 18, 2016 to Non Final Office Action mailed Nov. 20, 2015", 23 pgs.
"U.S. Appl. No. 12/170,068, Response filed Feb. 28, 2012 to Non Final Office Action mailed Nov. 29, 2011", 10 pgs.
"U.S. Appl. No. 12/170,068, Response filed Mar. 20, 2014 to Non Final Office Action mailed Dec. 20, 2013", 15 pgs.
"U.S. Appl. No. 12/170,068, Response filed Aug. 3, 2017 to Final Office Action mailed May 4, 2017", 9 pgs.
"U.S. Appl. No. 12/170,068, Response filed Aug. 5, 2015 to Final Office Action mailed May 12, 2015", 31 pgs.
"U.S. Appl. No. 12/170,068, Response filed Sep. 16, 2016 to Final Office Action mailed Jun. 16, 2016", 16 pgs.
"U.S. Appl. No. 12/170,068, Response filed Oct. 17, 2011 to Restriction Requirement mailed Sep. 16, 2011", 3 pgs.
"U.S. Appl. No. 12/170,068, Response filed Nov. 2, 2012 to Final Office Action mailed Aug. 2, 2012", 11 pgs.
"U.S. Appl. No. 12/170,068, Response filed Dec. 31, 2014 to Non Final Office Action mailed Aug. 13, 2014", 21 pgs.
"U.S. Appl. No. 12/170,068, Restriction Requirement mailed Sep. 16, 2011", 5 pgs.
"U.S. Appl. No. 12/970,974, Final Office Action mailed Sep. 12, 2013", 17 pgs.
"U.S. Appl. No. 12/970,974, Non Final Office Action mailed Mar. 6, 2013", 17 pgs.
"U.S. Appl. No. 12/970,974, Non Final Office Action mailed Jun. 9, 2014", 14 pgs.
"U.S. Appl. No. 12/970,974, Notice of Allowance mailed Jan. 22, 2015", 9 pgs.
"U.S. Appl. No. 12/970,974, Notice of Allowance mailed May 11, 2015", 9 pgs.
"U.S. Appl. No. 12/970,974, Notice of Allowance mailed Oct. 3, 2014", 9 pgs.
"U.S. Appl. No. 12/970,974, Response filed Jan. 10, 2014 to Final Office Action mailed Sep. 12, 2013", 9 pgs.
"U.S. Appl. No. 12/970,974, Response filed Jul. 8, 2013 to Non Final Office Action mailed Mar. 6, 2013", 15 pgs.
"U.S. Appl. No. 12/970,974, Response filed Aug. 29, 2014 to Non Final Office Action mailed Jun. 9, 2014", 9 pgs.
"U.S. Appl. No. 13/088,040, Final Office Action mailed Oct. 10, 2013", 11 pgs.
"U.S. Appl. No. 13/088,040, Non Final Office Action mailed Mar. 29, 2013", 10 pgs.
"U.S. Appl. No. 13/088,040, Notice of Allowance mailed Jun. 17, 2015", 6 pgs.
"U.S. Appl. No. 13/088,040, Response filed Jan. 10, 2014 to Final Office Action mailed Oct. 10, 2013", 17 pgs.
"U.S. Appl. No. 13/088,040, Response filed Aug. 29, 2013 to Non Final Office Action mailed Mar. 29, 2013", 13 pgs.
"U.S. Appl. No. 13/174,329, Examiner Interview Summary mailed Jun. 27, 2016", 3 pgs.
"U.S. Appl. No. 13/174,329, Final Office Action mailed Apr. 9, 2014", 17 pgs.
"U.S. Appl. No. 13/174,329, Final Office Action mailed Aug. 31, 2016", 15 pgs.
"U.S. Appl. No. 13/174,329, Non Final Office Action mailed Mar. 24, 2016", 14 pgs.
"U.S. Appl. No. 13/174,329, Non Final Office Action mailed Aug. 26, 2013", 13 pgs.
"U.S. Appl. No. 13/174,329, Response filed Feb. 25, 2014 to Non Final Office Action mailed Aug. 26, 2013", 17 pgs.
"U.S. Appl. No. 13/174,329, Response filed Jun. 20, 2013 to Restriction Requirement mailed May 20, 2013", 10 pgs.
"U.S. Appl. No. 13/174,329, Response filed Jun. 24, 2016 to Non Final Office Action mailed Mar. 24, 2016", 22 pgs.
"U.S. Appl. No. 13/174,329, Response filed Jul. 9, 2014 to Final Office Action mailed Apr. 9, 2014", 15 pgs.
"U.S. Appl. No. 13/174,329, Restriction Requirement mailed May 20, 2013", 8 pgs.

(56) References Cited

OTHER PUBLICATIONS

"U.S. Appl. No. 13/190,121, Appeal Brief filed Sep. 6, 2016", 26 pgs.
"U.S. Appl. No. 13/190,121, Examiner's Answer to Appeal Brief mailed Dec. 15, 2016", 7 pgs.
"U.S. Appl. No. 13/190,121, Final Office Action mailed Jan. 28, 2015", 12 pgs.
"U.S. Appl. No. 13/190,121, Final Office Action mailed Mar. 4, 2016", 14 pgs.
"U.S. Appl. No. 13/190,121, Non Final Office Action mailed Jan. 15, 2014", 9 pgs.
"U.S. Appl. No. 13/190,121, Non Final Office Action mailed Jan. 19, 2012", 8 pgs.
"U.S. Appl. No. 13/190,121, Non Final Office Action mailed Jun. 27, 2013", 10 pgs.
"U.S. Appl. No. 13/190,121, Non Final Office Action mailed Jul. 1, 2014", 11 pgs.
"U.S. Appl. No. 13/190,121, Non Final Office Action mailed Sep. 8, 2015", 13 pgs.
"U.S. Appl. No. 13/190,121, Non Final Office Action mailed Dec. 12, 2012", 8 pgs.
"U.S. Appl. No. 13/190,121, Notice of Allowance mailed Sep. 4, 2012", 8 pgs.
"U.S. Appl. No. 13/190,121, Notice of Panel Decision from Pre-Appeal Brief Review mailed May 19, 2015", 2 pgs.
"U.S. Appl. No. 13/190,121, Pre-Appeal Brief Request and Notice of Appeal filed Apr. 28, 2015", 7 pgs.
"U.S. Appl. No. 13/190,121, Pre-Appeal Brief Request filed Apr. 19, 2016", 8 pgs.
"U.S. Appl. No. 13/190,121, Pre-Brief Appeal Conference Decision mailed Jun. 8, 2016", 2 pgs.
"U.S. Appl. No. 13/190,121, Reply Brief filed Feb. 15, 2017", 12 pgs.
"U.S. Appl. No. 13/190,121, Response filed Mar. 11, 2013 to Non Final Office Action mailed Dec. 12, 2012", 11 pgs.
"U.S. Appl. No. 13/190,121, Response filed Apr. 15, 2014 to Non Final Office Action mailed Jan. 15, 2014", 14 pgs.
"U.S. Appl. No. 13/190,121, Response filed Apr. 19, 2012 to Non Final Office Action mailed Jan. 19, 2012", 9 pgs.
"U.S. Appl. No. 13/190,121, Response filed Sep. 25, 2013 to Non Final Office Action mailed Jun. 27, 2013", 11 pgs.
"U.S. Appl. No. 13/190,121, Response filed Sep. 30, 2014 to Non Final Office Action mailed Jul. 1, 2014", 15 pgs.
"U.S. Appl. No. 13/190,121, Response filed Dec. 8, 2015 to Non Final Office Action mailed Sep. 8, 2015", 15 pgs.
"U.S. Appl. No. 13/407,181, Final Office Action mailed Mar. 27, 2015", 21 pgs.
"U.S. Appl. No. 13/407,181, Final Office Action mailed May 26, 2016", 18 pgs.
"U.S. Appl. No. 13/407,181, Non Final Office Action mailed Aug. 28, 2014", 15 pgs.
"U.S. Appl. No. 13/407,181, Non Final Office Action mailed Nov. 18, 2015", 19 pgs.
"U.S. Appl. No. 13/407,181, Non Final Office Action mailed Nov. 23, 2016", 21 pgs.
"U.S. Appl. No. 13/407,181, Notice of Allowance mailed May 30, 2017", 12 pgs.
"U.S. Appl. No. 13/407,181, Preliminary Amendment filed Jan. 31, 2013", 3 pgs.
"U.S. Appl. No. 13/407,181, Response filed Jan. 17, 2014 to Restriction Requirement mailed Dec. 17, 2013", 4 pgs.
"U.S. Appl. No. 13/407,181, Response filed Feb. 11, 2016 to Non Final Office Action mailed Nov. 18, 2015", 17 pgs.
"U.S. Appl. No. 13/407,181, Response filed Feb. 23, 2017 to Non Final Office Action mailed Nov. 23, 2016", 14 pgs.
"U.S. Appl. No. 13/407,181, Response filed Jun. 9, 2015 to Final Office Action mailed Mar. 27, 2015", 19 pgs.
"U.S. Appl. No. 13/407,181, Response filed Aug. 1, 2016 to Final Office Action mailed May 26, 2016", 15 pgs.

"U.S. Appl. No. 13/407,181, Response filed Nov. 26, 2014 to Non Final Office Action mailed Aug. 28, 2014", 19 pgs.
"U.S. Appl. No. 13/407,181, Restriction Requirement mailed Dec. 17, 2013", 7 pgs.
"U.S. Appl. No. 14/820,423, Final Office Action mailed Dec. 6, 2017", 18 pgs.
"U.S. Appl. No. 14/820,423, Non Final Office Action mailed Jul. 5, 2017", 17 pgs.
"U.S. Appl. No. 14/820,423, Notice of Allowance mailed Mar. 26, 2018", 7 pgs.
"U.S. Appl. No. 14/820,423, Preliminary Amendment filed Sep. 17, 2015", 8 pgs.
"U.S. Appl. No. 14/820,423, Response filed Mar. 6, 2018 to Final Office Action mailed Dec. 6, 2017", 9 pgs.
"U.S. Appl. No. 14/820,423, Response filed Sep. 14, 2017 to Non Final Office Action mailed Jul. 5, 2017", 11 pgs.
"U.S. Appl. No. 16/015,630, Non Final Office Action mailed Jul. 7, 2020", 10 pgs.
"U.S. Appl. No. 16/015,630, Notice of Allowance mailed Oct. 26, 2020", 6 pgs.
"U.S. Appl. No. 16/015,630, Preliminary Amendment filed Jun. 22, 2018", 8 pgs.
"U.S. Appl. No. 16/015,630, Response filed Oct. 7, 2020 to Non Final Office Action mailed Jul. 7, 2020", 11 pgs.
"U.S. Appl. No. 17/248,578, Notice of Allowance mailed Nov. 18, 2022", 10 pgs.
"U.S. Appl. No. 18/159,792, Non Final Office Action mailed Mar. 12, 2024", 7 pgs.
"U.S. Appl. No. 18/159,792, Notice of Allowance mailed Apr. 30, 2024", 6 pgs.
"U.S. Appl. No. 18/159,792, Response filed Apr. 17, 2024 to Non Final Office Action mailed Mar. 12, 2024", 7 pgs.
"Canadian Application Serial No. 2,620,587, Request for Examination and Voluntary Amendment filed Sep. 2, 2011", 51 pgs.
"Changes to Lists on Spaces with the Last Release", [Online] Retrieved from the Internet : <http://thespacecraft.spaces.live. com/blog/cns!8AA 773FEOA 1289E3!36422.entry>, (Apr. 9, 2008), 4 pgs.
"Chinese Application Serial No. 200680036290.9, Notice on Grant mailed Jan. 22, 2010", 4 pgs.
"Chinese Application Serial No. 200680036290.9, Office Action mailed Mar. 20, 2009", 10 pgs.
"Chinese Application Serial No. 200680036290.9, Office Action mailed Sep. 4, 2009", 7 pgs.
"Chinese Application Serial No. 200680036290.9, Response filed Jul. 22, 2009 to Office Action mailed Mar. 20, 2009", 71 pgs.
"Chinese Application Serial No. 200780024347.8, Office Action mailed Jul. 29, 2010", 10 pgs.
"Chinese Application Serial No. 201280032542.6, Office Action mailed Feb. 24, 2016", 13 pgs.
"Chinese Application Serial No. 201280032542.6, Office Action mailed Aug. 29, 2016", 10 pgs.
"Chinese Application Serial No. 201280032542.6, Office Action mailed Dec. 12, 2016", 6 pgs.
"Chinese Application Serial No. 201280032542.6, Response filed Jul. 11, 2016 to Office Action mailed Feb. 24, 2016", 13 pgs.
"Chinese Application Serial No. 201280032542.6, Response filed Nov. 14, 2016 to Office Action mailed Aug. 29, 2016", 7 pgs.
"Chinese Application Serial No. 201380011451.9, Voluntary Amendment filed Feb. 12, 2015", 10 pgs.
"Coactive TV, Teleshuttle", [Online] Retrieved from the Internet : <http://teleshuttle.com/CoTV/> on Jan. 29, 2011, (Mar. 28, 2011), 2 Pgs.
"Configuring Multiple SSIDs", Cisco IOS Software Configuration Guide for Cisco Aironet Access Points 12.3(7)JA, [Online] Retrieved from the Internet : <http://www.cisco.com/en/US/docs/wireless/accesspoint/12.3_7_JA/configuration/guide/s37ssid.html>, on Oct. 24, 2011, (Nov. 4, 2011), 5 pgs.
"European Application Serial No. 06802991.7, Extended European Search Report mailed Jun. 14, 2012", 6 pgs.
"European Application Serial No. 07796299.1, Communication pursuant to Rules 70(2) and 70a(2) EPC mailed Oct. 31, 2011", 1 pg.

(56)          References Cited

OTHER PUBLICATIONS

"European Application Serial No. 07796299.1, Extended European Search Report mailed Oct. 12, 2011", 7 pgs.

"European Application Serial No. 07796299.1, Response filed Feb. 10, 2012 to Communication pursuant to Rules 70(2) and 70a(2) EPC mailed Oct. 31, 2011", 16 pgs.

"European Application Serial No. 12803616.7, Communication pursuant to Article 94(3) EPC mailed Jul. 27, 2016", 4 pgs.

"European Application Serial No. 12803616.7, Communication pursuant to Rules 70(2) and 70a(2) EPC mailed Dec. 9, 2014", 1 pg.

"European Application Serial No. 12803616.7, Extended European Search Report mailed Nov. 20, 2014", 6 pgs.

"European Application Serial No. 12803616.7, Response filed Jun. 12, 2015 to Communication pursuant to Rules 70(2) and 70a(2) EPC mailed Dec. 9, 2014", 12 pgs.

"European Application Serial No. 12803616.7, Response filed Sep. 7, 2016 to Communication pursuant to Article 94(3) EPC mailed Jul. 27, 2016", 10 pgs.

"European Application Serial No. 12803616.7, Summons to attend oral proceedings mailed Nov. 8, 2016", 7 pgs.

"European Application Serial No. 13754084.5, Communication Pursuant to Article 94(3) EPC mailed Jun. 9, 2015", 6 pgs.

"European Application Serial No. 13754084.5, Decision to Grant mailed Sep. 15, 2016", 2 pgs.

"European Application Serial No. 13754084.5, Intention to Grant mailed May 6, 2016", 5 pgs.

"European Application Serial No. 13754084.5, Response filed Sep. 30, 2015 to Communication Pursuant to Article 94(3) EPC mailed Jun. 9, 2015", 13 pgs.

"European Application Serial No. 13754084.5, Supplementary European Search Report mailed May 18, 2015", 5 pgs.

"European Application Serial No. 13754084.5, Supplementary Partial European Search Report mailed Jan. 22, 2015", 5 pgs.

"International Application Serial No. PCT/US2000/20685, International Search Report mailed Sep. 29, 2003", 3 pgs.

"International Application Serial No. PCT/US2006/034608, International Preliminary Report on Patentability mailed Apr. 1, 2008", 5 pgs.

"International Application Serial No. PCT/US2006/034608, International Search Report mailed Jan. 15, 2007", 2 pgs.

"International Application Serial No. PCT/US2007/014405, International Preliminary Report on Patentability mailed Jan. 15, 2009", 5 pgs.

"International Application Serial No. PCT/US2007/014405, Written Opinion mailed Dec. 11, 2007", 4 pgs.

"International Application Serial No. PCT/US2012/043413, International Preliminary Report on Patentability mailed Jan. 16, 2014", 5 pgs.

"International Application Serial No. PCT/US2012/043413, International Search Report mailed Nov. 28, 2012", 3 pgs.

"International Application Serial No. PCT/US2012/043413, Written Opinion mailed Nov. 28, 2012", 3 pgs.

"International Application Serial No. PCT/US2013/024246, International Preliminary Report on Patentability mailed Sep. 12, 2014", 6 pgs.

"International Application Serial No. PCT/US2013/024246, International Search Report mailed Apr. 26, 2013", 3 pgs.

"International Application Serial No. PCT/US2013/024246, Written Opinion mailed Apr. 26, 2013", 4 pgs.

"International Application Serial No. PCT/US2013/050963, International Search Report mailed Nov. 8, 2013", 4 pgs.

"International Application Serial No. PCT/US2013/050963, Written Opinion mailed Nov. 8, 2013", 9 pgs.

"Japanese Application Serial No. 2008-533377, Notice of Allowance mailed Dec. 16, 2011", 6 pgs.

"Japanese Application Serial No. 2008-533377, Notice of Rejection mailed May 31, 2011", 6 pgs.

"Japanese Application Serial No. 2008-533377, Response filed Aug. 25, 2011 to Notice of Rejection mailed May 31, 2011", 13 pgs.

"Japanese Application Serial No. 2014-518652, Office Action mailed May 31, 2016", 6 pgs.

"Japanese Application Serial No. 2014-518652, Request for Examination and Preliminary Amendment filed May 26, 2015", 8 pgs.

"Japanese Application Serial No. 2014-518652, Response filed Aug. 30, 2016 to Office Action mailed May 31, 2016", 13 pgs.

"Korean Application Serial No. 10-2008-7007693, Request for Examination and Amendment filed Aug. 26, 2011", 22 pgs.

"Malaysian Application Serial No. PI 20080636, Notice of Allowance mailed Aug. 30, 2013", 2 pgs.

"Malaysian Application Serial No. PI 20080636, Response filed Sep. 26, 2012 to Office Action mailed Jul. 31, 2012", 9 pgs.

"Mapquest.com Features", [Online] Retrieved from the Internet : <http://features.mapquest.com/>, (Oct. 27, 2010), 3 pgs.

"Nagra's cross-device user experience wins, Advanced User Interface Award at TV 3.0 conference", [Online] Retrieved from the Internet : <http://www.advanced-television.tv/index.php/2010/12/21/nagra%E2%80%99s-cross-device-user-experience-wins-%E2%80%9Cadvanced-user-interface%E2%80%9D-award-at-tv-3-0-conference>, (Mar. 28, 2011), 4 pgs.

"New Zealand Application Serial No. 566701, Examination Report and Notice of Acceptance mailed Jun. 11, 2010", 1 pg.

"New Zealand Application Serial No. 566701, Examination Report mailed May 18, 2010", 1 pg.

"New Zealand Application Serial No. 566701, Examination Report mailed Oct. 12, 2009", 2 pgs.

"New Zealand Application Serial No. 566701, Response filed Apr. 29, 2010 to Examination Report mailed Oct. 12, 2009", 17 pgs.

"New Zealand Application Serial No. 566701, Response filed May 24, 2010 to Examination Report mailed May 18, 2010", 4 pgs.

"Philippine Application Serial No. 1-2008-500513, Office Action mailed Sep. 9, 2011", 1 pg.

"Publicis & Yahoo Team For Cross-Carrier Marketing", [Online] Retrieved from the Internet : <http://www.mobilemarketingwatch.com/tag/cross-device-marketing/> Mar. 28, 2011, (Jul. 17, 2008), 4 pgs.

"Russian Application Serial No. 20081121996, Decision on Grant mailed Jun. 8, 2010", 15 pgs.

"Russian Application Serial No. 20081121996, Office Action mailed Mar. 30, 2010", 4 pgs.

"Russian Application Serial No. 20081121996, Response filed May 13, 2010 to Office Action mailed Mar. 30, 2010", 8 pgs.

"Smart WiFi for Android", S4BB Limited, [Online] Retrieved from the Internet : <http://www.s4bb.com/software/smartwifi/ smartwifi-for-android/> on Oct. 14, 2011, (Nov. 4, 2011), 5 pgs.

"South African Application Serial No. 2008/02681, Amendment filed Apr. 9, 2009", 3 pgs.

"Taiwanese Application Serial No. 101115394, Office Action and Search Report mailed Dec. 24, 2015", 9 pgs.

"Taiwanese Application Serial No. 101115394, Response filed Jun. 22, 2016 to Office Action mailed Apr. 27, 2016", 9 pgs.

"U.S. Department of the Interior, U.S. Geological Survey web page", publication captured by the Internet archive, retrieved at <<hllp://landcover.usgs.gov/flpdownload.asp>> on Dec. 20, 2015, (Sep. 10, 2005), 2 pgs.

"Workshop on Wearable Computer Systems", (Aug. 19-21, 1996), 3 pgs.

Agne, Brilingaite, "Online route prediction for automotive applications", [Online] Retrieved from the Internet : <http://www.cs.aau.dk/-csj/Papers/Files/2006_brilingaiteiTSS.pdf.>, (May 14, 2008), 9 pgs.

Amin, et al., "Fancy a Drink in Canary Wharf?: A User Study on Location-Based Mobile Search", INTERACT 2009—Proceedings of the 12th IFIP TC 13 International Conference on Human-Computer Interaction: Part I, (Aug. 24, 2006), 736-749.

Angermann, et al., "Software Representation for Heterogeneous Location Data Sources Using Probability Density Functions", International Symposium on Location Based Services for Cellular Users (LOCELLUS), Munich, Germany, (2001), 10 pgs.

Ashbrook, Daniel, et al., "Using GPS to learn significant locations and predict movement across multiple users", Personal and Ubiquitous Computing 7.5, (2003), 275-286.

(56) References Cited

OTHER PUBLICATIONS

Beard, et al., "Estimating Positions and Paths of Moving Objects", Seventh International Workshop on Temporal Representation and Reasoning (TIME 2000), (Jul. 2000), 8 pgs.

Benzoon, "SmartWiFi for BlackBerry: A Battery Power Optimizer", [Online] Retrieved from the Internet : <http://www. blackberryinsight. com/2011/06/03/smartwifi-for-blackberry-a-battery-power-optimizer/ >, (Jun. 3, 2011), 10 pgs.

Bhawalkar, et al., "ScheduleNanny Using GPS to Learn the User's Significant Locations, Travel Times and Schedule", [Online] Retrieved from the Internet : <http://arxiv.org/ftp/cs/papers/0409/0409003. pdf>, (Sep. 2, 2004), 7 pgs.

Biegel, et al., "A Framework for Developing Mobile, Context-Aware Applications", Proceedings of the Second IEEE Annual Conference on Pervasive Computing and Communications, (Mar. 14-17, 2004), 5 pgs.

Billinghurst, et al., "An Evaluation of Wearable Information Spaces", Proceedings of the Virtual Reality Annual International Symposium, (Mar. 1998), 8 pgs.

Billinghurst, "Research Directions in Wearable Computing", University of Washington, Retrieved at: <http://www.hill.washington. edu/consortium/mark598/sld001.hlm> on Apr. 4, 2005, (May 1998), 48 pgs.

Billinghurst, et al., "Wearable Devices: New Ways to Manage Information", IEEE Computer Society, (Jan. 1999), 57-64 pgs.

Bisdikian, et al., "Intelligent Pervasive Middleware for Context-Based and Localized Telematics Services", (Sep. 2002), 15-24.

Chen, et al., "A Survey of Context-Aware Mobile Computing Research", Dartmouth Computer Science Technical Report, (Nov. 2000), 16 pgs.

Chen, et al., "HarplaGrid: A Reliable Grid-based Routing Protocol for Vehicular Ad Hoc Networks", 11th International IEEE Conference on Intelligent Transportation Systems 2008, (ITSC 2008), 383-388.

Cheng, et al., "Location Prediction Algorithms for Mobile Wireless Systems", Wireless Internet Handbook: Technologies, Standards, and Applications, 2003, CRC Press, Boca Raton, FL, (2003), 17 pgs.

Choi, et al., "Performance Evaluation of Traffic Control Based on Geographical Information", IEEE International Conference on Intellegent Computing and Intelligent Systems (ICIS2009), (Dec. 2009), 85-89.

Console, et al., "Adaptation and Personalization on Board Cars: A Framework and Its Application to Tourist Services", Adaptive Hypermedia and Adaptive Web-Based Systems, Lecture Notes in Computer Science, vol. 2347-2006,Springer-Verlag Berlin, Heidelberg, (May 2002), 112-121.

Coyne, et al., "Comparison of Differentially Corrected GPS Sources for Support of Site-Specific Management in Agriculture", Kansas State University Agricultural Experiment Station and Cooperative Extension Service, (Jul. 2003), 35 pgs.

Dissanayake, et al., "A Solution to the Simultaneous Localization and Map Building (SLAM) Problem", Proceedings: IEEE Transactions on Robotics and Automation, vol. 17, No. 3, (Jun. 2001), 13 pgs.

Elfes, Alberto, "Using Occupancy Grids for Mobile Robot Perception and Navigation", IEEE Computer, 22(6), (1989), 46-57.

Falaki, "WLAN Interface Management on Mobile Devices", University of Waterloo, Waterloo, Ontario, Canada, (2008), 88 pgs.

Froehlich, et al., "Route Prediction from Trip Observations", 95: Detroit, Michigan USA, in Society of Automotive Engineers (SAE) World Congress, (2008), 13 pgs.

Gogate, et al., "Modeling Transportation Routines using Hybrid Dynamic Mixed Networks", Uncertainty in Artificial Intelligence (UAI), (2005), 8 pgs.

Goldstone, et al., "Group Path Formation", IEEE Transactions on Systems, Man, and Cybernetics, Part A: Systems and Humans, IEEE Conference on Communications, 2006, vol. 36, Issue 3, 611-620.

Hariharan, Ramaswamy, et al., "Project Lachesis: Parsing and Modeling Location Histories", ACM, In the Proceedings of GIScience, Geographic Information Science: Third International Conference, Adelphi, MD, Springer-Verlag GmbH, (2004), 106-124.

Harter, et al., "A Distributed Location System for the Active Office", IEEE Network, (Jan./Feb. 1994), 62-70.

Horvitz, et al., "Attention-Sensitive Altering", Proceedings of the UAI' 99 Conference on Uncertainty and Artificial Intelligence, (Jul. 1999), 10 pgs.

Horvitz, "Attention-Sensitive Altering in Computing Systems", Microsoft Research, (Aug. 1999), 26 pgs.

Horvitz, et al., "Bayesphone: Precomputation of Context-Sensitive Polices for Inquiry and Action in Mobile Devices", Proceedings of the Tenth Conference on User Modeling (UM 2005), Edinburgh, Scotland, (Jul. 2005), 10 pgs.

Horvitz, et al., "Coordinate: Probablistic Forecasting of Presence and Availability", Eighteenth Conference on Uncertainty in Artificial Intelligence, (Jul. 2002), 10 pgs.

Horvitz, et al., "Display of Information for Time-Critical Decision Making", Proceedings of the Eleventh Conference on Uncertainty in Artificial Inteligence, (Aug. 1995), 10 pgs.

Horvitz, et al., "In Pursuit of Effective Handsfree Decision Support: Coupling Bayesian Inference, Speech Understanding, and User Models", (1995), 8 pgs.

Horvitz, et al., "Learning and Reasoning about Interruption", Fifth International Conference on MultimodalInterfaces, (Nov. 2003), 20-27.

Horvitz, et al., "Mobile Opportunistic Planning: Methods and Models", Proceedings of the Eleventh Conference on User Modeling (UM 2005) Corfu, Greece, (Jun. 2007), 238-247.

Horvitz, et al., "Predestination", U.S. Appl. No. 60/721,879, filed Sep. 29, 2005.

Hu, et al., "Simulation-Assignment-based Travel Time Prediction Model for Traffic Corridors", IEEE Transactions on Intelligent Transportation Systems, vol. 13, Issue 3, (2012), 10 pgs.

Hu, et al., "Summary of Travel Trends", 2001 National Household Travel Survey, U.S. Department of Transportation, U.S. Federal Highway Administration, (Dec. 2004), 135 pgs.

Joachims, Thorsten, "Text Categorization with Support Vector Machines: Learning with Many Relevant Features", Proceedings of the 10th European Conference on Machine Learning, Lecture Notes In Computer Science, vol. 1398, (Apr. 21, 1998), 137-142.

Kamar, et al., "Mobile Opportunistic Commerce: Mechanisms, Architecture, and Application", Proceedings of AAMAS Estoril, Portugal, (May 2008), 8 pgs.

Kanoh, Hitoshi, et al., "Evaluation of GA-based Dynamic Route Guidance for Car Navigation Using cellular Automata", Intelligent Vehicle Symposium, IEEE vol. 1, (2002), 178-183.

Kanoh, Hitoshi, et al., "Knowledge Based Genetic Algorithm for Dynamic Route Selection", Proceedings of the Fourth International Conference on Knowledge Based Intelligent Engineering Systems and Allied Technologies 2000, vol. 2, (2000), 4 pgs.

Kanoh, Hitoshi, et al., "Route Guidance with Unspecified Staging Posts Using Generic Algorithm for Car Navigation Systems", Proceedings of Intelligent Transportation Systems, IEEE, (2000), 119-124.

Karbassi, et al., "Vehicle Route Prediction and Time of Arrival Estimation Techniques for Improved Transportation System Management, in Intelligent Vehicles Symposium", (2003), 511-516.

Kargl, et al., "Smart Reminder—Personal Assistance in a Mobile Computing Environment", Pervasive 2002, Zurich, Switzerland, (Aug. 26-28, 2002), 6 pgs.

Kari, Laasonen, "Route Prediction from Cellular Data", [Online] Retrieved from the Internet : <http://www.cs.helsinki.fi/group/ context/pubs/caps05.pdf>, (May 14, 2008), 10 pgs.

Kostove, et al., "Travel Destination Prediction Using Frequent Crossing Pattern from Driving History", Proceedings to the 8th International IEEE Conference on Intelligent Transportation Systems, Vienna, Austria, (Sep. 13-16, 2005), 970-977.

Krumm, et al., "Map Matching with Travel Time Constraints in Society of Automotive Engineers", {SAE) 2007 World Congress, 2007, Paper 2007-01-1102, Detroit, MI, (2007), 11 pgs.

(56) References Cited

OTHER PUBLICATIONS

Krumm, et al., "Predestination: Inferring Destinations from Partial Trajectories", in Eighth International Conference on Ubiquitous Computing; (UbiComp 2006) OrangeCounty, California, USA., [Online] Retrieved from the internet: <http://research.microsoft.com/enus/um/people/horvitzlpredestination.pdf> on Feb. 5, 2009, (Sep. 17-21, 2006), 1-18.

Krumm, et al., "Predestination: Where Do You Want to Go Today?", Computer, vol. 40, Issue 4, (Apr. 2007), 105-107.

Krumm, et al., "Route Prediction", U.S. Appl. No. 12/170,068, filed Jul. 9, 2008, 1-26.

Krumm, et al., "The Microsoft Multiperson Location Survey", (MSR-TR-2005-103), Microsoft Research, (Aug. 2005), 4 pgs.

Krumm, John, "A Markov Model for Driver Turn Prediction", Paper No. 2008-01-0195, SAE 2008, (2008), 7 pgs.

Krumm, John, "Real Time Destination Prediction Based On Efficient Routes", Society of Automotive Engineers (SAE) World Congress, Retrieved at <<http://research.microsoft.com/enus/um/people/jckrumm/Publications%202006/efficient%20routes%20camera%20ready.pdf>>, (Apr. 2006), 6 pgs.

Krumm, John, "Where will they turn: predicting turn proportions at intersections", Personal and Ubiquitous Computing, vol. 13, Issue 7, Received Jan. 16, 2009, Accepted Jul. 8, 2009, Spriner-Verlag, London Limited, (Aug. 20, 2009), 591-599.

Lai, et al., "Hierarchical Incremental Path Planning and Situation-Dependent Optimized Dynamic Motion Planning considering Accelerations", IEEE Transactions on Systems, Man, and Cybernetics—Part B, Cybernetics, vol. 37, Issue 6, (Dec. 2007), 1541-1554.

Lee, et al., "Design and implementation of a movement history analysis framework for the taxi telematics system", Proceedings of the 14th Asia-Pacific Conference on Communications (APCC2008), (Oct. 2008), 4 pgs.

Leichner, et al., "Trip Router with Individualized Preferences (TRIP): Incorporating Personalization into Route Planning", Eighteenth Conference on Innovative Applications of Artificial Intelligence, (Jul. 2006), 6 pgs.

Liao, et al., "Learning and Inferring Transportation Routines", American Association for Artificial Intelligence Press (AAAI) 19th National Conference on Artificial Intelligence, San Jose, California, [Online]. Retrieved from the Internet: <http://www.cs.rochester.edu/-kautz/papers/gps-tracking.pdf>, (Jul. 25-29, 2004), 348-353.

Liu, et al., "Location Awareness Through Trajectory Prediction", Department of Information Science and Telecommunications, University of Pittsburgh, Pittsburgh, Pennsylvania, Computers, Environment and Urban Systems, vol. 30, No. 6, Retrieved at <<http://www.sis.pitt.edu/-xliu/papers/ceus.pdf>>, (May 2006), 1-38.

Liu, et al., "Remaining Delivery Time Estimation based Routing for Intermittently Connected Mobile Networks", 28th International Conference on Distributed Computing Systems Workshops, (Jun. 2008), 222-227.

Losee, "Minimizing information overload: the ranking of electronic messages", Journal of Information Science 15, Elsevier Science Publishers BV, (Jun. 1989), 179-189.

Marmasse, et al., "A User-Centered Location Model", Personal and Ubiquitous Computing, 6, (2002), 318-321.

Mcginty, et al., "Personalised Route Planning: A Case-Based Approach", Advances in Case-Based Reasoning, Springer Berlin Heidelberg, (2000), 431-443.

Mcginty, et al., "Shared Experiences in Personalized Route Planning", FLAIRS-02 Conference, (May 2002), 111-115.

Mesonzhnik, et al., "Improving Low Accuracy Positional Data by Detecting Improbable Samples", U.S. Appl. No. 13/152,229, filed Jun. 3, 2011, 24 pgs.

Miyashita, et al., "A Map Matching Algorithm for Car Navigation Systems that Predict User Destination", Advanced Information Networking and Applications (AINAW) Workshops 2008, (Mar. 2008), 7 pgs.

Orebaugh, et al., "Wireless Sniffing with Wireshark", Wireshark & Ethereal Network Protocol Analyzer Toolkit, Chapter 6, (Sep. 2006), 104 pgs.

Patterson, et al., "Inferring High-Level Behavior from Low-Level Sensors", in UbiComp 2003: Ubiquitous Computing, Springer: Seattle, Washington USA, (2003), 73-89.

Patterson, et al., "Opportunity Knocks: a System to Provide Cognitive Assistance with Transportation Services", UbiComp 2004: Ubiquitous Computing, Nottingham, UK, Springer, (2004), 18 pgs.

Persad, Maharaj, et al., "Real-time travel path prediction using gps-enabled mobile phones", Presented at the 15th World Congress on Intelligent Transportation Systems, New York, New York, Paper# 30413, Retrieved at <<http://www.csee.usf.edu/REU/REU_2008/publications/Persad%20Maharaj%20-%20PathPrediction%20-%20july%2031.pdf>>, (Nov. 16-20, 2008), 12 pgs.

Peter, Lamb, et al., "Avoiding Explicit Map-Matching In Vehicle Location", [Online] Retrieved from the Internet : <http://users.rsise.anu.edu.auHhiebaux/papers/its99.doc>, (May 14, 2008), 9 pgs.

Rhodes, et al., "Remembrance Agent: A continuously running automated information retrieval system", The Proceedings of The First International Conference on The Practical Application Of Intelligent Agents and Multi Agent Technology, (Apr. 1996), 487-495.

Rhodes, Bradley J, "The wearable remembrance agent: A system for augmented memory", Personal Technologies Journal Special Issue on Wearable Computing, (1997), 12 pgs.

Rhodes, Bradley J, "The wearable remembrance agent: A system for augmented memory", The Proceedings of The First International Symposium on Wearable Computers, (Oct. 1997), 9 pgs.

Rish, Irina, "An empirical study of the naive Bayes classifier", IJCAI-01 Workshop on Empirical Methods in AI, (Nov. 2, 2001), 7 pgs.

Samaan, Nancy, et al., "A User Centric Mobility Prediction Approach Based on Spatial Conceptual Maps", IEEE International Conference on Communications 2005, ICC, vol. 2, (2005), 1413-1417.

Sananmongkhonchai, et al., "Cell-based Traffic Estimation from Multiple GPS-Equipped Cars", IEEE Region 10 conference, TENCON 2009, (Jan. 2009), 6 pgs.

Schilit, et al., "Disseminating Active Map Information to Mobile Hosts", IEEE Network, vol. 8—No. 5, (Sep.-Oct. 1994), 1-23.

Schilit, et al., "The ParcTab Mobile Computing System", IEEE WWOS-IV, (Oct. 1993), 4 pgs.

Schilit, Bill N, et al., "Context-Aware Computing Applications", IEEE Workshop of Mobile Computing Systems and Applications, (1994), 7 pgs.

Schilit, Bill N, et al., "Customizing Mobile Applications", Proceedings USENIX Symposium on Mobile & Location, (1993), 9 pgs.

Schilit, William N, "A System Architecture for Context-Aware Mobile Computing", Columbia University, (1995), 153 pgs.

Shanmugan, Sam K, et al., "Random Signals: Detection, Estimation and Data Analysis", Wiley and Sons, (1988), 664 pgs.

Simmons, et al., "Learning to Predict Driver Route and Destination Intent", in 2006 IEEE Intelligent Transportation Systems Conference, Toronto, Canada, (2006), 127-132.

Smailagic, et al., "Location Sensing and Privacy in A Context-Aware Computing Environment", IEEE Wireless Communications, (Oct. 2002), 8 pgs.

Spreitzer, et al., "Architectural Considerations for Scalable, Secure, Mobile Computing with Location Information", In The 14th International Conference on Distributed Computing Systems, (Jun. 1994), 29-38.

Spreitzer, et al., "Providing Location Information in a Ubiquitous Computing Environment", SIGOPS '93, (Dec. 1993), 270-283.

Spreitzer, et al., "Scalable, Secure, Mobile Computing with Location Information", Communications of the ACM, vol. 36, No. 7, (Jul. 1993), 27 pgs.

Starner, "Wearable Computing and Contextual Awareness", Massachusetts Institute of Technology, (Jun. 1999), 248 pgs.

Tanaka, et al., "A Destination Prediction Method Using Driving Contexts and Trajectory for Car Navigation Systems", The ACM Symposium on Applied Computing, Honolulu, Hawaii, U.S.A, Retrieved at <<http://portal.acm.org/citation.cfm?id=1529323&di=GUIDE&coli=GUIDE&CFID=105849362&CFTOKEN=57920356>>, (Mar. 8-12, 2009), 190-195.

(56) References Cited

OTHER PUBLICATIONS

Terada, et al., "Design of a Car Navigation System that Predicts User Destination", Proceedings of the 7th International Conference on Mobile Data Management (MDM'06), (May 2006), 6 pgs.

Theimer, et al., "Operating System Issues for PDAs", In Fourth Workshop on Workstation Operating Systems, (Oct. 1993), 7 pgs.

Torkkola, et al., "Traffic Advisories Based on Route Prediction", in Workshop on Mobile Interaction with the Real World (MIR W 2007), Singapore, (2007), 4 pgs.

Van, Sellen, et al., "Context-Aware Recommendations in the Mobile Tourist Application Compass", AH 2004, Eindhoven, The Netherlands, LNCS 3137, Springer-Verlag, Adaptive Hypermedia and Adaptive Web-Based Systems In Adaptive Hypermedia and Adaptive Web-Based Systems, (Aug. 2004), 235-244.

Vanajakshi, et al., "Support Vector Machine Technique for the Short Term Prediction of Travel Time", 2007 IEEE Intelligent Vehicles Symposium, (Jun. 13-15, 2007), 600-605.

Vaughan-Nichols, "Will Mobile Computing's Future be Location, Location, Location?", Computer, vol. 42, Issue 2, (Feb. 2009), 14-17.

Want, et al., "Active Badges and Personal Interactive Computing Objects", IEEE Transactions on Consumer Electronics, vol. 38, No. 1, (Feb. 1992), 10-20.

Want, et al., "The Active Badge Location System", ACM Transactions on Information Systems, vol. 10, No. 1, (Jan. 1992), 91-102.

Wei, et al., "Development of Freeway Travel Time Forecasting Models by Integrating Different Sources of Traffic Data", IEEE Transactions on Vechicular Technology, vol. 56, No. 6, (Nov. 2007), 3682-3694.

Wei, et al., "PATS: A Framework of Pattern-Aware Trajectory Search", IEEE Eleventh International Conference on Mobile Data Management, (2010), 372-377.

Weiser, Mark, "Some Computer Science Issues in Ubiquitous Computing", to appear in CACM, vol. 36, No. 7, (Jul. 1993), 75-84.

Weiser, Mark, "The Computer for the Twenty-First Century", Scientific American, 265(3), (Sep. 1991), 94-104.

Wu, et al., "A Dynamic Navigation Scheme for Vehicular Ad Hoc Networks", Latest Trends on Communications, (Aug. 2010), 85-90.

Xie, et al., "Development of Navigation System for Autonomous Vehicle to Meet the DARPA Urban Grand Challenge", Proceedings of the IEEE Intelligent Transportation Systems Conference, (Sep. / Oct. 2007), 767-772.

Ye, et al., "Predict Personal Continuous Route", Proceedings of the 11th International IEEE Conference on Intelligent Transportation Systems, (Oct. 2008), 587-592.

* cited by examiner

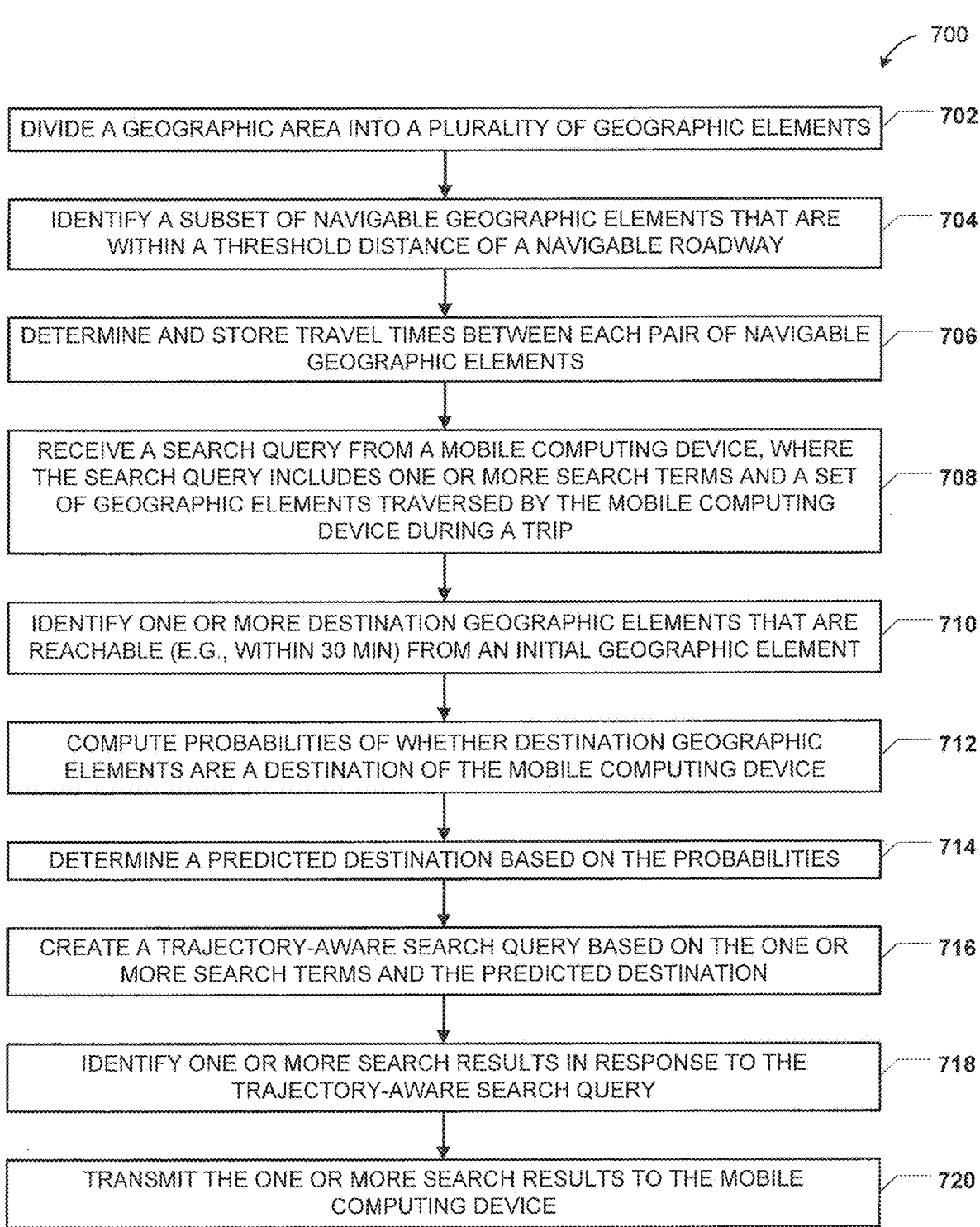

700

702 — DIVIDE A GEOGRAPHIC AREA INTO A PLURALITY OF GEOGRAPHIC ELEMENTS

704 — IDENTIFY A SUBSET OF NAVIGABLE GEOGRAPHIC ELEMENTS THAT ARE WITHIN A THRESHOLD DISTANCE OF A NAVIGABLE ROADWAY

706 — DETERMINE AND STORE TRAVEL TIMES BETWEEN EACH PAIR OF NAVIGABLE GEOGRAPHIC ELEMENTS

708 — RECEIVE A SEARCH QUERY FROM A MOBILE COMPUTING DEVICE, WHERE THE SEARCH QUERY INCLUDES ONE OR MORE SEARCH TERMS AND A SET OF GEOGRAPHIC ELEMENTS TRAVERSED BY THE MOBILE COMPUTING DEVICE DURING A TRIP

710 — IDENTIFY ONE OR MORE DESTINATION GEOGRAPHIC ELEMENTS THAT ARE REACHABLE (E.G., WITHIN 30 MIN) FROM AN INITIAL GEOGRAPHIC ELEMENT

712 — COMPUTE PROBABILITIES OF WHETHER DESTINATION GEOGRAPHIC ELEMENTS ARE A DESTINATION OF THE MOBILE COMPUTING DEVICE

714 — DETERMINE A PREDICTED DESTINATION BASED ON THE PROBABILITIES

716 — CREATE A TRAJECTORY-AWARE SEARCH QUERY BASED ON THE ONE OR MORE SEARCH TERMS AND THE PREDICTED DESTINATION

718 — IDENTIFY ONE OR MORE SEARCH RESULTS IN RESPONSE TO THE TRAJECTORY-AWARE SEARCH QUERY

720 — TRANSMIT THE ONE OR MORE SEARCH RESULTS TO THE MOBILE COMPUTING DEVICE

FIG. 7

MOBILE SEARCH BASED ON PREDICTED LOCATION

BACKGROUND

Portable devices such as mobile phones are typically small, lightweight, and easily carried by users. As technology has advanced, such portable devices have provided users with an increasing amount of "on-the-go" functionality. For example, portable devices can incorporate a digital camera, a media player, and Internet-surfing capabilities. Some portable devices also include a global positioning system (GPS) transceiver. The ability to detect a current location of the portable device may enable location-based searches at the portable device. For example, a user of a mobile phone may perform (e.g., via a browser or a maps application) a search for restaurants that are near the current location. However, such a listing may not always be useful. For example, if the user is in a car that is traveling on a highway, identifying restaurants that the user has already travelled past may not be useful.

Other devices, such as vehicle navigation systems, may identify points of interest that are along a route of the vehicle. However, the vehicle navigation system may not be able to identify such points of interest unless a user has previously identified their intended destination.

SUMMARY

Systems and methods of performing a search at a mobile computing device and generating search results based on a predicted (e.g., future) location of the mobile computing device are disclosed. When a user enters one or more search terms into the mobile computing device, the mobile computing device may transmit a search query that includes the one or more search terms and a location history of the mobile computing device to a server. For example, the location history may be used (e.g., by a location prediction service accessible to the server) to predict a future location of the mobile computing device. The predicted location of the mobile computing device may be a predicted destination of the mobile computing device, a point along a predicted route of the mobile computing device, or some other location. The search terms from the user may be augmented with information regarding the predicted location, thereby creating a trajectory-aware search query. The trajectory-aware search query may be transmitted to a search engine to identify trajectory-aware search results that may be more relevant to a travelling user than search results identified solely based on a current location of the user.

In alternate implementations, the future location(s) of the mobile computing device may be predicted at the mobile computing device instead of at a server or by a location prediction service. The mobile search techniques disclosed herein may identify trajectory-aware search results even when an intended destination or an intended route of the mobile computing device are not expressly input by a user. Thus, the disclosed systems and methods may be operable "out of the box."

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 is a flow diagram to illustrate another particular embodiment of a method of performing mobile search based on a predicted location.

DETAILED DESCRIPTION

In a particular embodiment, a method includes receiving one or more search terms at a mobile computing device while the mobile computing device is located at a particular location. The method also includes transmitting a search query to a server. The search query includes the one or more search terms and a location history of the mobile computing device. The method further includes receiving a search result in response to the search query, where the search result includes content identified based on a predicted destination of the mobile computing device. The method includes displaying an interface at the mobile computing device that identifies the search result.

In another particular embodiment, a non-transitory computer-readable storage medium includes instructions that, when executed by a computer, cause the computer to receive a search query from a mobile computing device. The search query includes one or more search terms and a set of geographic elements traversed by the mobile computing device during a trip. The instructions are also executable to cause the computer to determine a predicted location of the mobile computing device based on the set of geographic elements and to create a trajectory-aware search query based on the one or more search terms and the predicted location. The instructions are further executable to cause the computer to identify one or more search results in response to the trajectory-aware search query and to transmit the one or more search results to the mobile computing device.

In another particular embodiment, a system includes a location indicator, an input interface, an output interface, and a network interface. The system also includes a processor and a memory storing instructions executable by the processor to track a location history based on outputs of the location indicator. The instructions are also executable by the processor to receive one or more search terms via the input interface and to predict a destination based on the location history. The instructions are further executable to create a trajectory-aware search query based on the one or more search terms and the predicted destination. The instructions are executable to transmit the trajectory-aware search query to a search engine via the network interface and to receive one or more search results from the search engine via the network interface. The instructions are also executable to display content associated with the one or more search results via the output interface.

Figure 1:
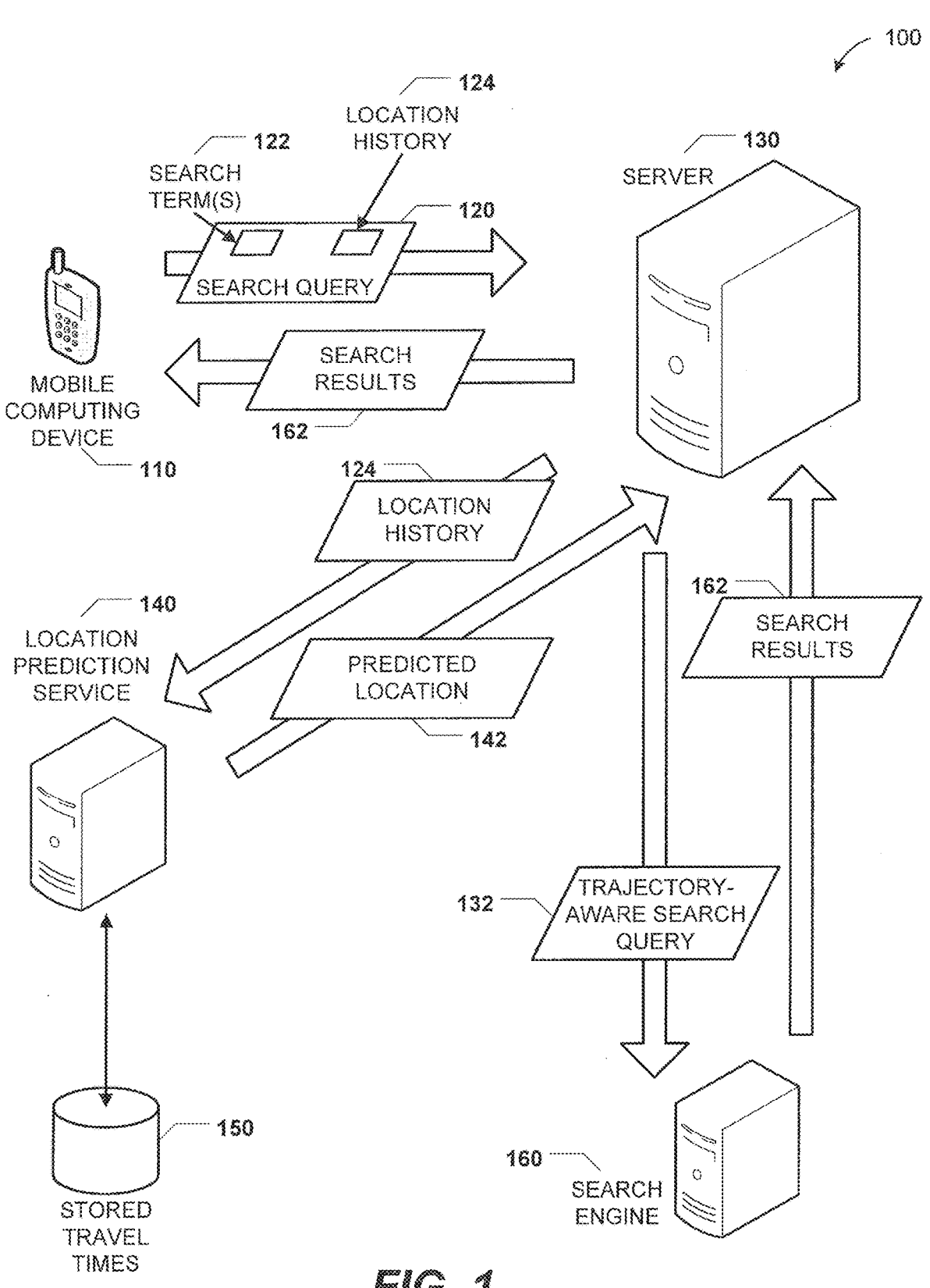
FIG. 1 is a diagram to illustrate a particular embodiment of a system to perform mobile search based on a predicted location.

FIG. 1 is a diagram to illustrate a particular embodiment of a system 100 to perform mobile search based on a predicted location. The system 100 includes a server 130 communicatively coupled to a mobile computing device 110, a location prediction service 140, and a search engine server 160. However, it should be noted that alternate implementations may include one or more of the server 130, the location prediction service 140, and the search engine server 160 incorporated into a single device.

The mobile computing device 110 may be a mobile telephone, a smartphone, a portable digital assistant (PDA), a laptop computer, a tablet computer, a netbook computer, a navigation device, a digital camera, a watch or other electronic apparel or accessory, or some other portable electronic device or portable computing device. The mobile computing device 110 may include one or more input and output interfaces or devices. For example, the mobile computing device 110 may be a mobile telephone that includes input devices such as a keypad and a microphone, output devices such as a speaker, and combination input/output devices such as a capacitive touchscreen. The mobile computing device 110 may also include a location indicator such as a GPS transceiver. When sampled, the location indicator may return a current location of the mobile computing device 110. In alternate embodiments, other forms of location measurement may be used by or provided to the mobile computing device 110. For example, the current location of the mobile computing device 110 may be determined from one or more wireless (e.g., Wi-Fi) access points, cellular towers, Bluetooth radios, or a separate location determining device (e.g., a vehicle's navigation system).

In a particular embodiment, the mobile computing device 110 is operable to detect the start and stop of a trip made by a user that possesses the mobile computing device 110. Trips may be detected automatically or in response to user input. For example, the start of a car trip may be detected when the mobile computing device 110 experiences a sudden and large change in velocity. During the trip, the mobile computing device 110 may sample the location indicator to maintain a location history 124 of the mobile computing device 110. For example, the location history 124 may identify a set of one or more geographic elements (e.g., geographic cells, road segments, or other geographic elements) traversed by the mobile computing device 110 during the trip.

In a particular embodiment, the mobile computing device 110 samples the location indicator periodically (e.g., upon expiration of a sampling period such as 5 seconds). The mobile computing device 110 may identify a geographic element corresponding to the location returned by the location indicator and add the geographic element to the location history 124. In a particular embodiment, the geographic element is not added to the location history 124 unless the geographic element is more than a threshold distance (e.g., 20 meters) from a previously returned location. In alternate embodiments, a sampling period other than 5 seconds and a threshold distance other than 20 meters may be used.

When the mobile computing device receives 110 a search query 120 including one or more search terms 122 from the user, the mobile computing device 120 may add the location history 124 (or information related to the location history 124) to the search query 120 before transmitting the search query 120 to the server 130. For example, the search terms 122 may be received via a browser application or a maps application executing at the mobile computing device 110.

The server 130 may receive the search query 120 from the mobile computing device 110. In a particular embodiment, the server 130 identifies a predicted location 142 of the mobile computing device 110 after receiving the search query 120. For example, the predicted location 142 may be a predicted destination of the mobile computing device 110, a point on a predicted route of the mobile computing device 110, or some other location. In certain situations, a predicted destination of the mobile computing device 110 may correspond to the current location of the mobile computing device 110 (i.e., the location of the mobile computing device 110 when the search terms 122 were entered). That is, the server 130 may predict that a user has arrived at his or her intended destination, will make a round-trip, or will not travel anywhere else for a period of time. Alternately, the predicted destination of the mobile computing device 110 may be different than the current location of the mobile computing device 110.

The server 130 may add information regarding the predicted location 142 to the search query 120 to generate a trajectory-aware search query 132. For example, the trajectory-aware search query 132 may include the search terms 122 and geographic coordinates or keywords corresponding to the predicted location 142. To illustrate, if the search terms 122 included "hardware store" and the predicted location was "Seattle, Washington," the trajectory-aware search query 132 may include "hardware store Seattle, Washington." The trajectory-aware search query 132 may be transmitted to a search engine server 160 to generate the search results 162. For example, the search engine server 160 may correspond to an Internet-accessible search engine.

In a particular embodiment, the server 130 utilizes a location prediction service 140 to identify the predicted location 142. For example, the server 130 may extract the location history 124 from the search query 120 and may transmit the location history 124 to the location prediction service 140. The location prediction service 140 may use the location history 124 to determine the predicted location 142 and may transmit the predicted location 142 to the server 130. For example, the location prediction service 140 may include or may have access to stored travel times 150 corresponding to a geographic region. The stored travel times 150 may include estimates of how long it takes to travel (e.g., by foot, bicycle, motorcycle, car, public transportation, or any combination thereof) between two points in the geographic region. The location prediction service 140 may use the stored travel times 150 and other information or assumptions (e.g., that most trips are less than half an hour in duration) to determine the predicted location 142. An exemplary method of predicting a future location based on a location history is described with reference to FIGS. 3-4.

In a particular embodiment, the mobile computing device 110 transmits updated location histories to the server 130 during a trip. For example, an updated location history may indicate movement of the mobile computing device 110 from a first location to a second location. The server 130 may use the updated location histories to refine the predicted location 142 and to identify updated search results via the search engine server 160. For example, the trajectory-aware search query 132 may be transmitted to the search engine server 160 via a search engine application programming interface (API). The server 130 may transmit the updated search results to the mobile computing device 110, where the updated search results are displayed alongside or instead of the search results 162 (e.g., at a graphical user interface (GUI) generated by the mobile computing device 110). An exemplary search interface is further described with reference to FIG. 5.

In another particular embodiment, trajectory-aware search is not performed if the search terms 122 include a geographic search term. To illustrate, if the search terms 122 or a second search query included "hardware store Portland, Oregon" instead of merely "hardware store," the mobile computing device 120 may not add the location history 124 to the search query 120, since the search terms 122 already specify a geographic target. Alternately, the mobile computing device 110 may add the location history 124, but the server 130 may ignore the location history 124 and may transmit the search query 120 to the search engine server 160 as-is to retrieve search results regarding hardware stores in the Portland, Oregon area (e.g., independently of a trajectory of the mobile computing device 110).

In yet another embodiment, the location history 124 may be used for disambiguation purposes. For example, if the search terms 122 included "hardware store Portland," the server 130 may use the location history 124 and the predicted location 142 to deduce that a mobile phone is travelling towards Portland, Oregon and not Portland, Maine. The server 130 may thus prioritize search results associated with Portland, Oregon over those associated with Portland, Maine. Alternately, or in addition, the location history 124 may be used to suggest auto-complete search terms. For example, if a user located in Bellevue, Washington types "Kir" into a search interface while the user is traveling from Bellevue, Washington towards Kirkland, Washington, the search term "Kirkland" may be provided as a suggested auto-completion of the user's partially entered search query.

In another particular embodiment, the server 130 or the location prediction service 140 may compute a speed of the mobile computing device 110. For example, each geographic element in the location history 124 may have an associated timestamp representing when the mobile computing device 110 added the geographic element to the location history 124. The speed of the mobile computing device 110 may be computed based on the timestamps and may be used to augment the trajectory-aware search query 132, refine the trajectory-aware search results 162, identify additional search results, or any combination thereof. For example, a user may traverse the same sequence of geographic cells or road segments via a highway or via city streets. The computed speed of the mobile computing device 110 may be greater when the user is on the highway than when the user is on city streets. When the speed indicates that the user is on the highway (e.g., the speed is greater than a threshold), search results close to or associated with one or more exits on the highway may be prioritized. In other embodiments, a predicted location of a mobile computing device may also be used for non-search related purposes. For example, the predicted location may be used to determine traffic conditions en-route to the predicted location, to suggest alternate routes to the predicted location, or for other non-search related purposes.

In operation, the mobile computing device 110 may receive the search terms 122 and may generate the search query 120 based on the search terms 122. The mobile computing device 110 may also add the location history 124 to the search query 120 and transmit the search query 120 with the location history 124 to the server 130. The server

130 may identify the predicted location 142 of the mobile computing device 110 based on the location history 124. For example, the server 130 may transmit the location history 124 to the location prediction service 140 and receive the predicted location 142 from the location prediction service 140. The server may augment the search terms 122 with the predicted location 142 to generate the trajectory-aware search query 132. The server may identify the one or more trajectory-aware search results 162 based on the trajectory-aware search query 132 (e.g., via the search engine server 160). The server 130 may transmit the trajectory-aware search results 162 to the mobile computing device 110.

It will be appreciated that the system 100 of FIG. 1 may improve the mobile search experience in multiple ways. For example, the system 100 of FIG. 1 may decrease the amount of time and/or number of searches a user performs before the user locates a desired point of interest. As another example, the system 100 of FIG. 1 may provide trajectory-aware search results that are not returned by conventional search techniques, thereby providing greater choice to the user. In addition, the system 100 of FIG. 1 may provide mobile and localized search capabilities in situations where the user is unfamiliar with his or her surroundings.

Figure 2:
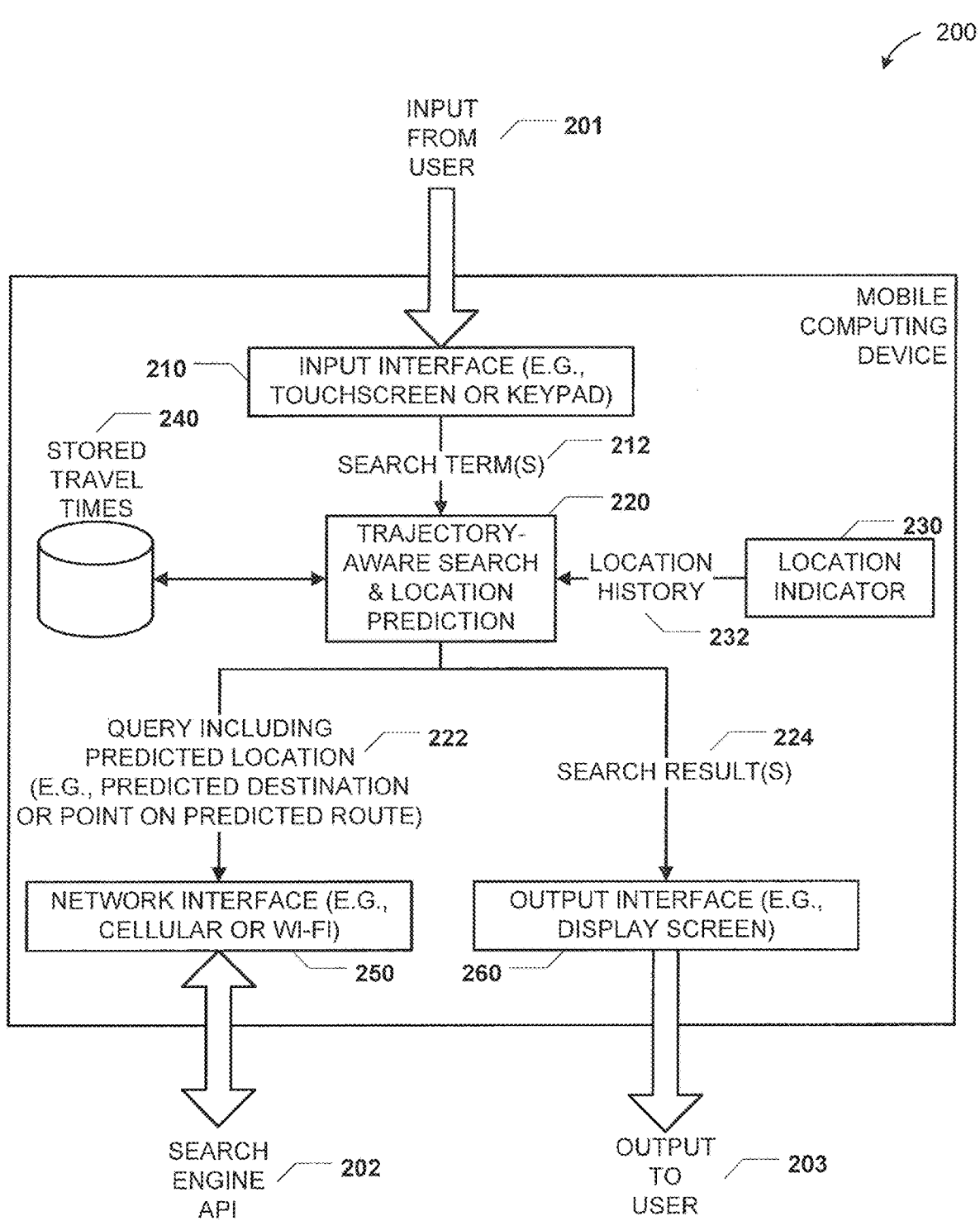
FIG. 2 is a diagram to illustrate another particular embodiment of a system to perform mobile search based on a predicted location.

It should be noted that although the system 100 of FIG. 1 depicts a separate mobile computing device 110, server 130, location prediction service 140, and search engine server 160, one or more components of the system 100 may be integrated into a single device. For example, FIG. 2 illustrates a particular embodiment of a mobile computing device 200 operable to perform mobile search based on a predicted location.

The mobile computing device 200 may integrate the functionality and operations described with reference to the mobile computing device 100, the server 130, and the location prediction service 140 of FIG. 1. For example, the mobile computing device 200 may include an input interface 210, such as a touchscreen or keypad. The input interface 210 may be operable to receive input 201 from a user. The mobile computing device 200 may also include a location indicator 230 (e.g., a GPS transceiver). When sampled, the location indicator 230 may provide a location (e.g., GPS coordinates) of the mobile computing device 200.

The mobile computing device 200 may further include a network interface 250. For example, the network interface 250 may be a wireless interface such as a cellular network interface or Wi-Fi network interface. The network interface 250 may be operable to communicate with network-based entities such as an Internet-accessible search engine. In a particular embodiment, the mobile computing device 200 communicates with the Internet-accessible search engine via an API 202. The mobile computing device 200 may also include an output interface 260 operable to provide output 203 to a user. For example, the output interface 260 may be a display screen. In a particular embodiment, the input interface 210 and the output interface 260 are integrated into a single device, such as a capacitive touchscreen.

The mobile computing device 200 may also include a trajectory-aware search and location prediction module 220. In a particular embodiment, the module 220 is implemented by processor-executable instructions. For example, such instructions may be stored at a memory of the mobile computing device 200 and may be executed by a processor of the mobile computing device 200. It should be noted that although the trajectory-aware search and location prediction module 220 is illustrated in FIG. 2 as a single module, functionality of the trajectory-aware search and location prediction module 220 may be implemented using any number of hardware or software logic blocks or modules.

During operation, the location indicator 230 may be sampled (e.g., periodically) to track a location history 232 of the mobile computing device 200. The input interface 210 may receive the input 201 from a user, where the input 201 represents one or more search terms 212. The search terms 212 may be input into the trajectory-aware search and location prediction module 220. The trajectory-aware search and location prediction module 220 may determine a predicted location of the mobile computing device 200 based on the location history 232. In a particular embodiment, predicting the location includes reference to a database or table of stored travel times 240. For example, the stored travel times 240 may be stored in a non-volatile memory of the mobile computing device 200.

The module 220 may generate a trajectory-aware search query 222 that includes the predicted location. For example, the predicted location may be a predicted destination of the mobile computing device 200 or may be a point on a predicted route of the mobile computing device 222. The trajectory-aware search query 222 may be transmitted to a search engine via the network interface 250. The search engine may return one or more trajectory-aware search results 224 that may be displayed to the user via the output interface 260 as the output 203. For example, the search results 224 may be associated with the predicted location of the mobile computing device 200. Alternately, the trajectory-aware search query 222 may be used to search one or more local data stores (e.g., local databases, files, or applications) at the mobile computing device 200 instead of a search engine.

It will be appreciated that the system 200 of FIG. 2 may integrate trajectory-aware search functionality into a single device, such as a mobile phone or a portable navigation system. The system 200 of FIG. 2 may thus enhance user convenience and provide mobile device hardware or software manufacturers with a differentiating location-based search feature.

Figure 3:
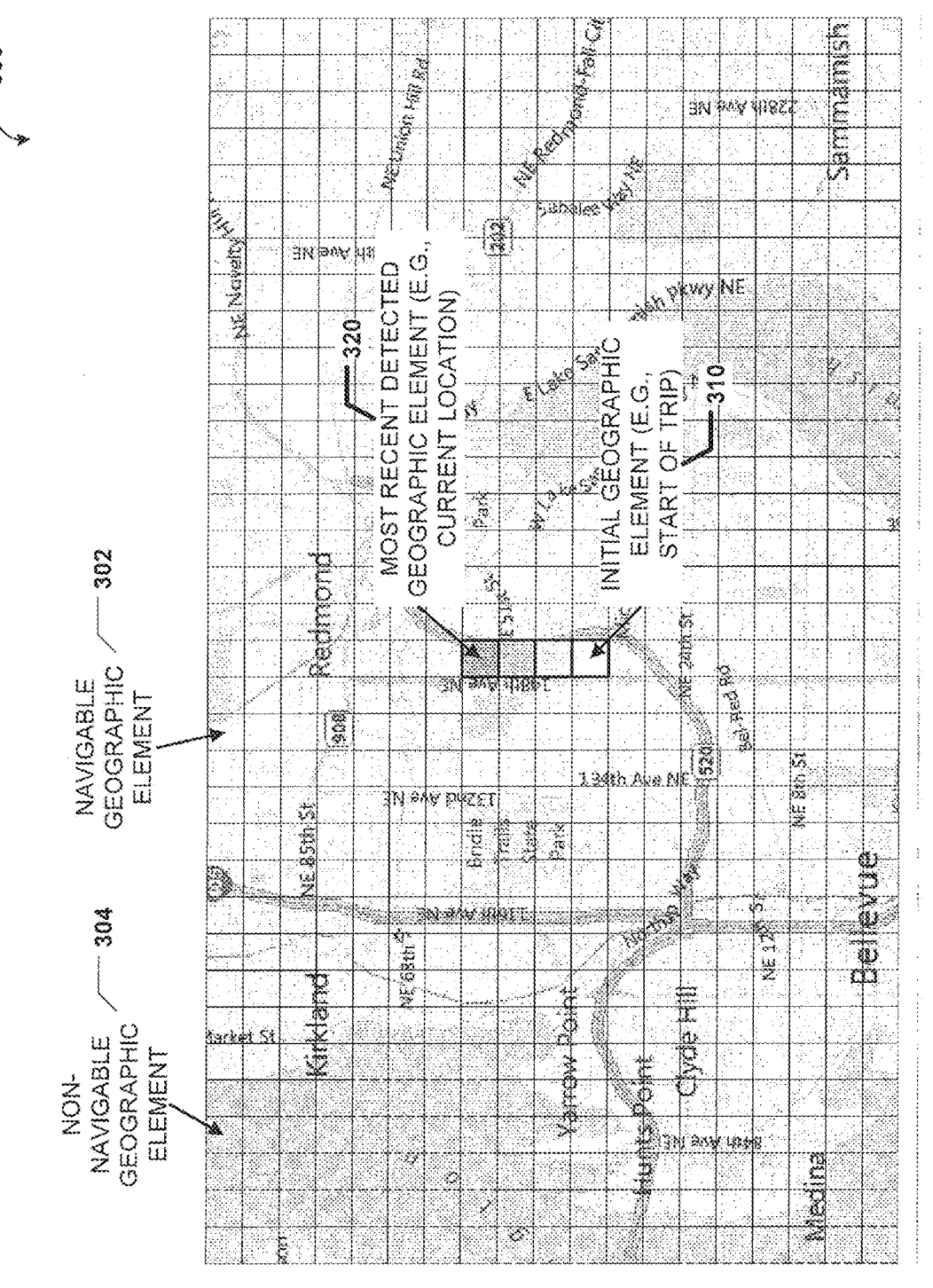
FIG. 3 is a diagram to illustrate a particular embodiment of a grid of geographic elements useable by the system of FIG. 1 or the system of FIG. 2.
Figure 4:
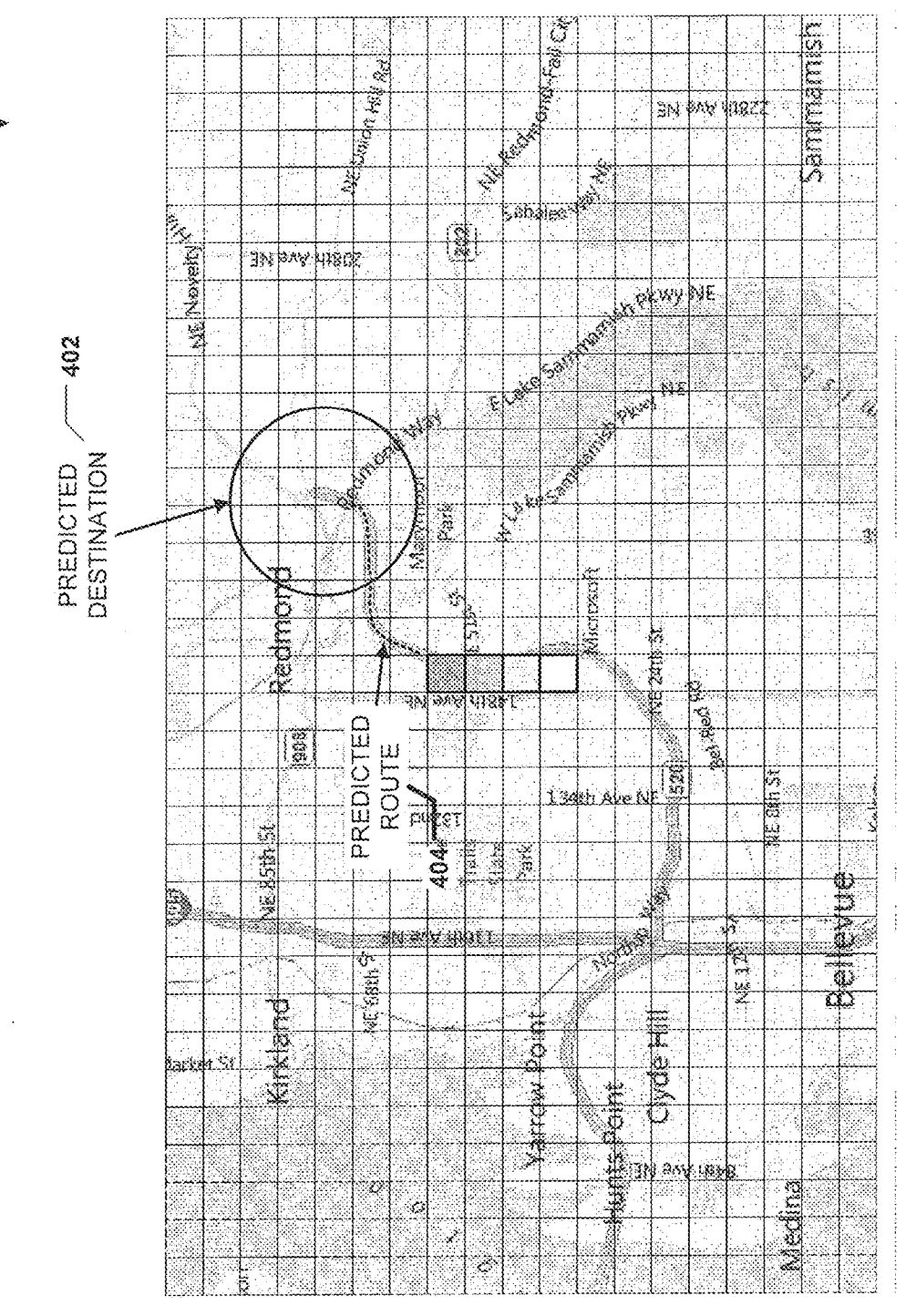
FIG. 4 is a diagram to illustrate a particular embodiment of a predicted route and a predicted destination at the grid of FIG. 3.

FIGS. 3-4 illustrate a particular embodiment of a method of predicting a location based on a location history. It should be noted that the illustrated location prediction method is for example only. Various location prediction methods may be used in conjunction with the trajectory-aware mobile search techniques disclosed herein.

In a particular embodiment, predicting locations based on location histories includes performing one or more initial (e.g., preparation) operations prior to making any predictions. A geographic area may be divided into a plurality of geographic elements. For example, FIG. 3 depicts a grid 300 divided into a plurality of equal-sized (e.g., 150 meter×150 meter) geographic elements representing a portion of the greater Seattle, Washington area.

The grid 300 may include one or more navigable geographic elements 302 and one or more non-navigable geographic elements 304. In a particular embodiment, the navigable geographic elements 302 represent geographic elements that are within a threshold distance (e.g., 150 meters) from a navigable roadway. When the grid 300 is divided into geographic elements, a corresponding set of geographic elements may be created. A subset of the navigable geographic elements 302 may then be identified (e.g., by removing non-navigable geographic elements from the set) and travel times may be determined between each pair of navigable geographic elements. The travel times may be stored for future reference at one or more data storage devices (e.g., as the stored travel times 150 of FIG. 1 or the stored travel times 240 of FIG. 2). In a particular embodiment, the number of calculations to be performed may be reduced by a factor of two by assuming that travel time between two geographic cells will be equal regardless of travel direction.

As a mobile computing device (e.g., the mobile computing device 100 of FIG. 1 or the mobile computing device 200 of FIG. 2) traverses the geographic elements of the grid 300, a location history of the mobile computing device may be tracked. For example, the location history may represent the trajectory illustrated in FIG. 3, where the trajectory includes an initial geographic element 310 (e.g., a start of a trip) and a most recent detected geographic element 320 (e.g., a current location). The trajectory may be used to determine one or more of a predicted destination 402 and a predicted route 404 of the mobile computing device, as illustrated in FIG. 4.

In a particular embodiment, one or more destination elements are identified, where the destination elements are reachable within a predetermined time from the initial geographic element 310. For example, the predetermined time may be 30 minutes, based on an assumption or an empirical observation that most trips take less than 30 minutes to complete. The destination elements may be identified based on the previously stored travel times. For each such destination geographic element, a probability of whether the destination geographic element is a future location (e.g., destination) of the mobile computing device may be computed. Based on the computed probabilities, one or more of the predicted destination 402 and the predicted route 404 may be determined. The predicted destination 402 and/or the predicted route 404 may be used to identify trajectory-aware search results (e.g., search results near the predicted destination and/or along the predicted route 404).

In another particular embodiment, the predicted destination 402, the predicted route 404, and the computed probabilities may be stored for each user session to improve performance. Thus, when an updated location history is received, the predicted destination 402 and predicted route 404 may be updated without re-computing the probabilities. In another particular embodiment, each geographic element in a location history may be associated with a timestamp (e.g., representing when the mobile computing device entered, exited, or was located in the geographic element). The timestamps may be used to compute a speed of the mobile computing device, and the computed speed may be used to identify additional trajectory-aware search results or may be used to prioritize or refine previously identified search results. For example, when the computed speed is greater than a threshold (e.g., 55 miles per hour), search results associated with highway exits may be identified or prioritized.

It will be appreciated that the location prediction method of FIGS. 3-4 may enable trajectory-aware search at mobile computing devices. It will also be appreciated that the method of FIGS. 3-4 may protect user privacy. For example, only those locations relevant to a current trip may be tracked, and locations traversed during old trips may be deleted once a trip has been completed. In addition, the method of FIGS. 3-4 may operate based on a broad resolution of 150 meter×150 meter areas instead of tracking more precise addresses or coordinates visited by users.

Figure 5:
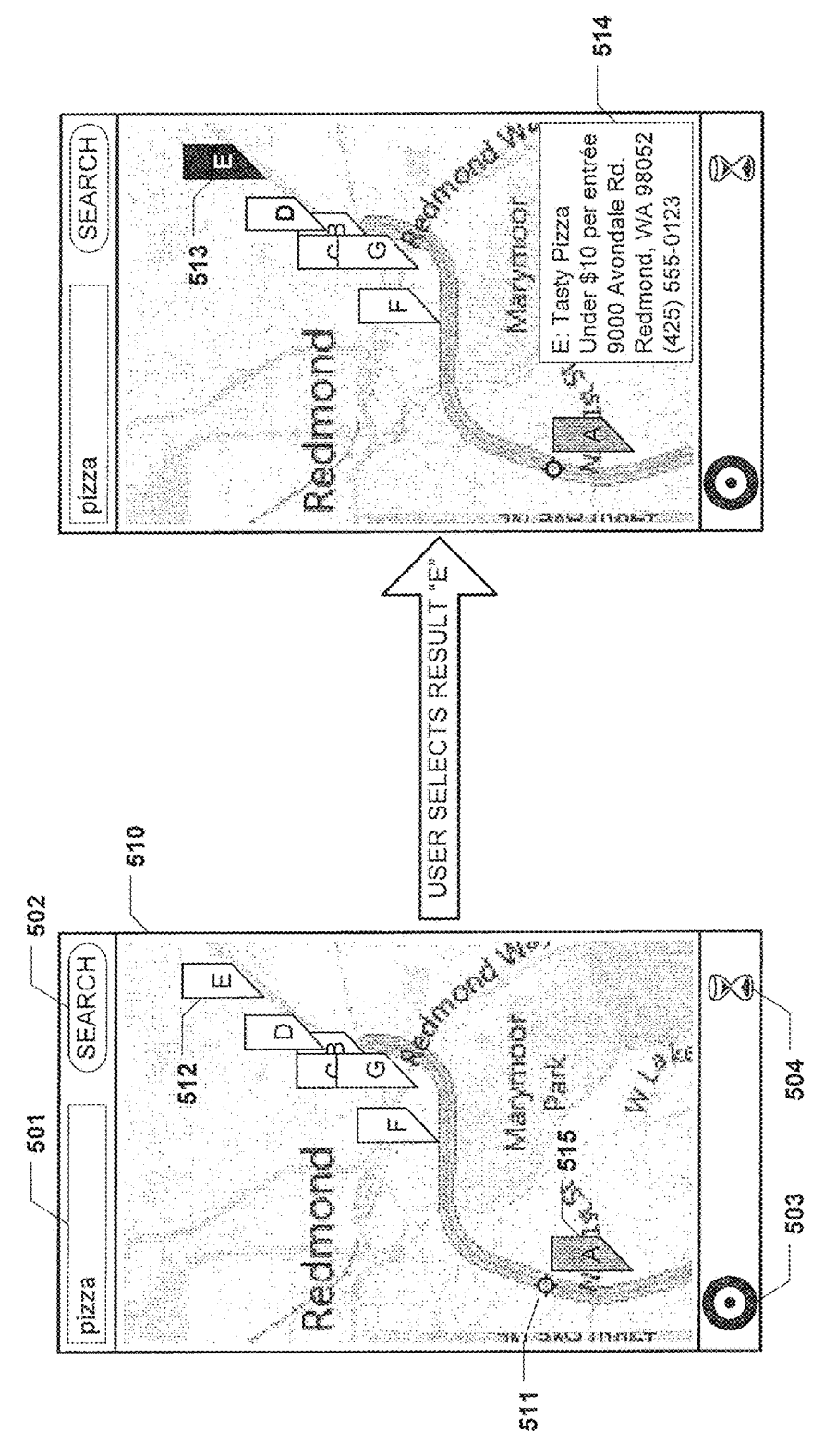
FIG. 5 is a diagram to illustrate a particular embodiment of a displayed interface at the mobile computing device of FIG. 1 or the mobile computing device of FIG. 2.

FIG. 5 is a diagram to illustrate a particular embodiment of a trajectory-aware search interface 500. For example, the interface 500 may be displayed by the mobile computing device 110 of FIG. 1 or the mobile computing device 200 of FIG. 2.

In a particular embodiment, the interface includes a search field 501 and a search control 502. For example, the search field 501 may accept text input corresponding to one or more search terms, and the search control 502 may be a button operable to submit the search query to a trajectory-aware search program. To illustrate, a user presented with the interface 500 may enter a search term "pizza," indicating that he or she is interested in finding a pizza restaurant. The interface 500 may also include a map area 510. The map area 510 may depict a region surrounding a current location 511 of a mobile computing device. The interface 500 may also include a bulls-eye icon 503 operable to center the map area 510 on the current location 511 and a timer icon 504 operable to view a history of previously conducted searches. Alternately, other icons or text-based controls may be displayed. In a particular embodiment, the map area 510 is interactive and may support panning and zooming operations.

In response to a search query (e.g., "pizza"), one or more search results may be generated and displayed (e.g., overlaid) on the map area 510. For example, the search results may be generated as described with reference to the search results 162 of FIG. 1 or the search results 224 of FIG. 2. The search results may include trajectory-aware search results, trajectory-unaware search results (e.g., results based on just the term "pizza" and/or the current location 511 of the mobile computing device), or any combination thereof. To illustrate, trajectory-aware search results (e.g., a search result 512 "E") may be denoted by a white flag at the interface 500, and trajectory-unaware search results (e.g., a search result 515 "A") may be denoted by a gray flag at the interface.

In a particular embodiment, each search result is interactive. For example, the user may select the search result 512 "E," and the associated flag may change from white to black, as illustrated at 513. In addition, an information box 514 may be displayed, where the information block 514 includes information associated with the location or business corresponding to the selected search result 512 "E". For example, for a pizza restaurant, the information box 514 may include a name, a price range, an address, and a phone number of the pizza restaurant. In other embodiments, the information box 514 may also include or be operable (e.g., via selection) to view reviews of the pizza restaurant submitted by other users.

It should be noted that the retail (e.g., "hardware store") and restaurant (e.g., "pizza") searches described herein are for example only. The disclosed mobile search techniques may be applied to any other search domain. For example, trajectory-aware mobile search may be performed on local (e.g., city, state, or municipal) content, web content, advertising, traffic information, friends or friend groups (e.g., in social networks), and other information domains. Moreover, trajectory information may not only be used to identify search results, but also to prioritize or rank search results, to compute information related to the trajectory (e.g., a remaining time to arrival at the predicted destination), and to pre-fetch search results or content likely to be retrieved by a user during subsequent searches or Internet-browsing sessions.

Figure 6:
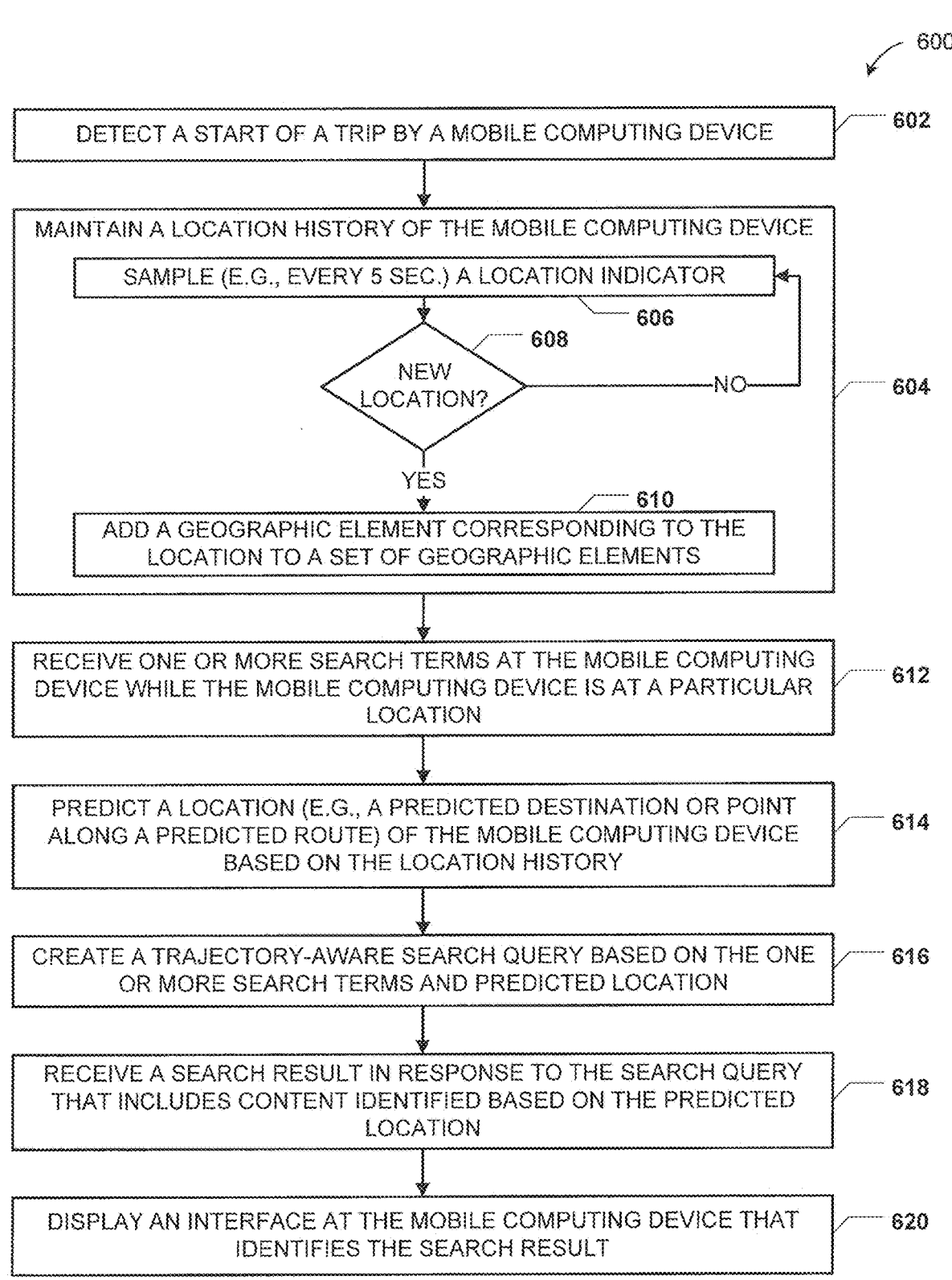
FIG. 6 is a flow diagram to illustrate a particular embodiment of a method of performing mobile search based on a predicted location.

FIG. 6 is a flow diagram to illustrate a particular embodiment of a method 600 of performing mobile search based on predicted location. In an illustrative embodiment, the method 600 may be performed at the mobile computing device 110 of FIG. 1 or the mobile computing device 200 of FIG. 2.

The method 600 may include detecting a start of a trip by a mobile computing device, at 602. For example, in FIG. 2, the trajectory-aware search and location prediction module 220 may detect the start of a trip. The method 600 may also include maintaining a location history of the mobile computing device, at 604. In a particular embodiment, maintaining the location history includes performing an iterative process. The process may include sampling a location indicator, at 606. For example, the location indicator may be sampled every five seconds. When it is determined, at 608, that a location returned by the sample indicator is a new location, the process may include adding a geographic element corresponding to the returned location to a set of geographic elements, at 610. When the returned location is not a new location, the process may iterate back to 606. The location history may continue to be tracked until the trip ends, at which point the location history may be deleted. In other embodiments, the location histories may be saved (e.g., on a per-user basis).

The method 600 may further include receiving one or more search terms at the mobile computing device while the mobile computing device is at a particular location, at 612. For example, in FIG. 2, the search terms 212 may be received via the input interface 210. The method 600 may include predicting a location of the mobile computing device based on the location history, at 614. The predicted location may be a predicted destination of the mobile computing device or a point along a predicted route of the mobile computing device. For example, in FIG. 2, the trajectory-aware search and location prediction module 220 may determine the predicted location based on the location history 232.

The method 600 may also include creating a trajectory-aware search query based on the one or more search terms and the predicted location, at 616. For example, in FIG. 2, the trajectory-aware search and location prediction module 220 may create the trajectory-aware search query 222. The method 600 may further include receiving a search result or search results in response to the search query, at 618. The search result includes content identified based on the predicted location. For example, in FIG. 2, the search results 224 may be received via the network interface 250.

The method 600 may include displaying an interface at the mobile computing device that identifies the search result, a 620. For example, in FIG. 2, the interface may be displayed via the output interface 260. In an illustrative embodiment, the displayed interface is the interface 500 of FIG. 5.

FIG. 7 is a flow diagram to illustrate another particular embodiment of a method 700 of performing mobile search based on a predicted location. In a particular embodiment, the method 700 may be performed at the system 100 of FIG. 1 and is illustrated with reference to FIGS. 3-4.

The method 700 may include dividing a geographic area into a plurality of geographic elements, at 702. For example, in FIG. 1, the location prediction service 140 may divide a geographic area into a plurality of geographic elements. To illustrate, the geographic area may be divided into the grid 300 of FIG. 3.

The method 700 may also include identifying a subset of navigable geographic elements that are within a threshold distance of a navigable roadway, at 704. For example, in FIG. 1, the location prediction service 140 may identify a subset of geographic elements. To illustrate, the subset of navigable geographic elements may be the subset of navigable geographic elements 302 of FIG. 3.

The method 700 may further include determining and storing travel times between each pair of navigable geographic elements, at 706. For example, in FIG. 1, the location prediction service may generate the stored travel times 150. The method 700 may include receiving a search query from a mobile computing device, at 708. The search query may include one or more search terms and a set of geographic elements traversed by the mobile computing device during a trip. For example, in FIG. 1, the server 130 may receive the search query 120 from the mobile computing device 110, where the search query 120 includes the search terms 122 and the location history 124. In an illustrative embodiment, the location history 124 includes a set of geographic elements traversed by the mobile computing device 110 during the trip. The method 700 may also include identifying one or more destination geographic elements that are reachable from an initial geographic element, at 710. For example, referring to FIG. 3, the initial geographic element may be the initial geographic element 310 of FIG. 3.

The method 700 may further include computing probabilities of whether the destination geographic elements are a destination of the mobile computing device, at 712, and determining a predicted destination based on the probabilities, at 714. For example, referring to FIG. 4 the predicted destination may be the predicted destination 402. Alternately, a point on the predicted route 404 may be determined. In a particular embodiment, the probabilities are computed based on an algorithm that relies on an assumption that travelers typically choose at least moderately efficient routes to a desired destination. Based on a user's trajectory (e.g., location history), the algorithm may compute how efficiently the user has approached or is approaching each potential destination (e.g., cell in the grid 300 of FIG. 3). The efficiencies may be used to compute the probability that each potential destination is the intended destination of the user. In some embodiments, a Markov model may be used during execution of the prediction algorithm. However, it should be noted that other models or other location prediction algorithms may also be used.

The method 700 may include creating a trajectory-aware search query based on the one or more search terms and the predicted destination, at 716, and identifying one or more search results in response to the trajectory-aware search query, at 718. For example, in FIG. 1, the server 130 may create the trajectory-aware search query 132 and may receive the search results 162. The method 700 may further include transmitting the one or more search results to the mobile computing device, at 720. For example, in FIG. 1, the server 130 may transmit the search results 162 to the mobile computing device 110. All or a portion of the method 700 may be re-executed to update the search results (e.g., as the user travels towards the predicted location or performs additional searches).

Figure 8:
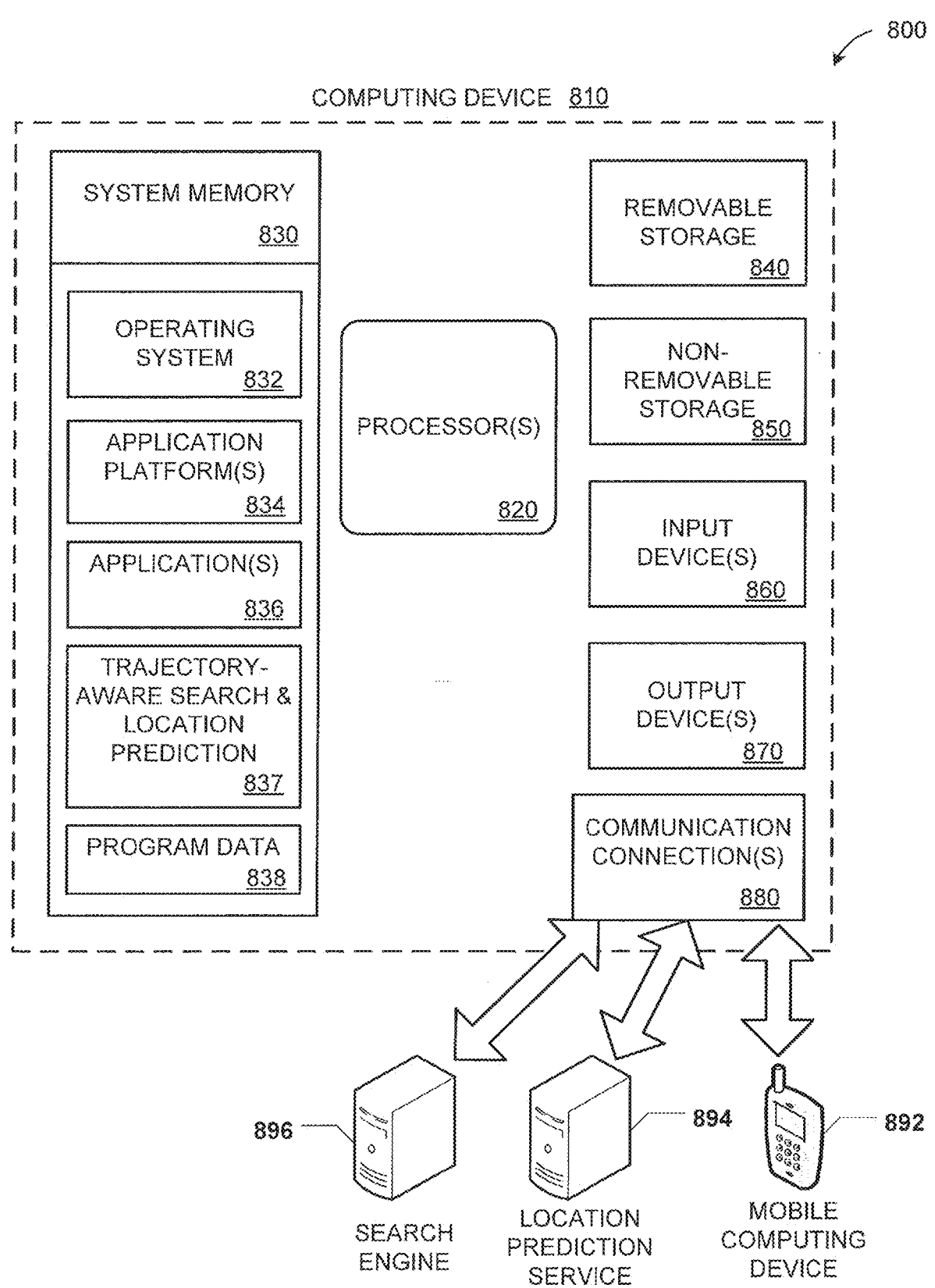
FIG. 8 is a block diagram of a computing environment including a computing device operable to support embodiments of computer-implemented methods, computer program products, and system components as illustrated in FIGS. 1-7.

FIG. 8 shows a block diagram of a computing environment 800 including a computing device 810 operable to support embodiments of computer-implemented methods, computer program products, and system components according to the present disclosure. For example, the computing device 810 or components thereof may include, implement, or be included as a component of the mobile computing device 110 of FIG. 1, the server 130 of FIG. 1, the location prediction service 140 of FIG. 1, the mobile computing device 200 of FIG. 2, the search engine server 160, or any portions thereof.

The computing device 810 includes at least one processor 820 and a system memory 830. For example, the computing device 810 may be a desktop computer, a laptop computer, a tablet computer, a mobile phone, a server, or any other fixed or mobile computing device. Depending on the configuration and type of computing device, the system memory 830 may be volatile (such as random access memory or "RAM"), non-volatile (such as read-only memory or "ROM," flash memory, and similar memory devices that maintain stored data even when power is not provided), non-transitory, some combination of the three, or some other memory. The system memory 830 may include an operating system 832, one or more application platforms 834, one or more applications 836, and program data 838. In the embodiment illustrated, the system memory 830 includes a trajectory-aware search and location prediction module 837. In an illustrative embodiment, the trajectory-aware search and location prediction module 837 is the trajectory-aware search and location prediction module 220 of FIG. 2 or is incorporated into one or more of the mobile computing device 110, the server 130, and the location prediction service 140 of FIG. 1.

The computing device 810 may also have additional features or functionality. For example, the computing device 810 may also include removable and/or non-removable additional data storage devices such as magnetic disks, optical disks, tape, and memory cards. Such additional storage is illustrated in FIG. 8 by removable storage 840 and non-removable storage 850. Computer storage media may include volatile and/or non-volatile storage and removable and/or non-removable media implemented in any technology for storage of information such as computer-readable instructions, data structures, program components or other data. The system memory 830, the removable storage 840, and the non-removable storage 850 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 810. Any such computer storage media may be part of the computing device 810. In an illustrative embodiment, such computer storage media is used to store the stored travel times 150 of FIG. 1 or the stored travel times 240 of FIG. 2.

The computing device 810 may also have input device(s) 860, such as a keyboard, mouse, pen, voice input device, touch input device, etc. connected via one or more input interfaces. In an illustrative embodiment, the input device(s) 860 include the input interface 210 of FIG. 2. Output device(s) 870, such as a display, speakers, printer, etc. may also be included and connected via one or more output interfaces. In an illustrative embodiment, the output device(s) 870 include the output interface 260 of FIG. 2.

The computing device 810 also contains one or more communication connections 880 that allow the computing device 810 to communicate with other computing devices over a wired or a wireless network. In an illustrative embodiment, the communication connections 880 include the network interface 250 of FIG. 2. The other computing devices may include one or more of a mobile computing device 892 (e.g., the mobile computing device 100 of FIG. 1 or the mobile computing device 200 of FIG. 2), a location prediction service 894 (e.g., the location prediction service 140 of FIG. 1), and a search engine 896 (e.g., the search engine server 160 of FIG. 1). For example, the one or more communication connections 880 may represent an interface that communicates with other computing devices via a network.

It will be appreciated that not all of the components or devices illustrated in FIG. 8 or otherwise described in the previous paragraphs are necessary to support embodiments as herein described. For example, the removable storage 840 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
receiving, at a server from a computing device, one or more search terms;
predicting a location based on a location history associated with the computing device, the predicting comprising:
identifying one or more destination elements in a geographic region;
determining probabilities that the one or more destination elements are a future location of the computing device; and
identifying the predicted location based on the probabilities;
creating a trajectory-aware search query based on the one or more search terms and the predicted location;
triggering a search engine to perform a search using the trajectory-aware search query to obtain one or more trajectory-aware search results;
triggering the search engine to perform a search using a trajectory-unaware search query to obtain one or more trajectory-unaware search results, the trajectory-unaware query being based on the one or more search terms without the predicted location; and
causing display of the one or more trajectory-unaware search results and the one or more trajectory-aware search results on the computing device, the trajectory-unaware search results being displayed visually different than the trajectory aware search results.

2. The method of claim 1, wherein the predicted location is at least partly based on a travel time estimate, the travel time estimate being based on a time to travel from a current location to the predicted location.

3. The method of claim 2, wherein the travel time estimate is based on one of travel by foot, travel by motorcycle, travel by car, or travel by public transportation.

4. The method of claim 1, further comprising:
accessing an updated location history of the computing device that indicates movement of the mobile computing device from a first location to a second location;
generating at least one updated search result; and
causing display of the at least one updated search result on the computing device.

5. The method of claim 1, wherein the one or more destination elements are identified based on being reachable from a current location of the computing device within a predetermined amount of time.

6. The method of claim 1, further comprising:
based on the location history, predicting a route of the computing device, wherein the predicted location comprises a point on the predicted route of the computing device.

7. The method of claim 6, further comprising:
based on the predicted route, pre-fetching content likely to be retrieved by a user of the computing device.

8. The method of claim 1, further comprising:

identifying a speed of the computing device based on timestamps associated with the location history, wherein one or more of the trajectory-aware search results are based at least in part on the computed speed of the computing device.

9. The method of claim 1, further comprising:

identifying a speed of the computing device based on timestamps associated with the location history; and based on the speed being above a threshold, searching for results associated with one or more exits of a highway associated with the predicted location.

10. A system comprising:

one or more hardware processors; and a memory device storing instructions that, when executed by the one or more hardware processors, cause the one or more hardware processors to perform operations comprising:

receiving, from a computing device, one or more search terms;

predicting a location based on a location history associated with the computing device, the predicting comprising:

identifying one or more destination elements in a geographic region;

determining probabilities that the one or more destination elements are a future location of the computing device; and identifying the predicted location based on the probabilities;

creating a trajectory-aware search query based on the one or more search terms and the predicted location;

triggering a search engine to perform a search using the trajectory-aware search query to obtain one or more trajectory-aware search results;

triggering the search engine to perform a search using a trajectory-unaware search query to obtain one or more trajectory-unaware search results, the trajectory-unaware query being based on the one or more search terms without the predicted location; and causing display of the one or more trajectory-unaware search results and the one or more trajectory-aware search results on the computing device, the trajectory-unaware search results being displayed visually different than the trajectory aware search results.

11. The system of claim 10, wherein the predicted location is at least partly based on a travel time estimate, the travel time estimate being based on a time to travel from a current location to the predicted location.

12. The system of claim 10, wherein the operations further comprise:

accessing an updated location history of the computing device that indicates movement of the mobile computing device from a first location to a second location;

generating at least one updated search result; and causing display of the at least one updated search result on the computing device.

13. The system of claim 10, wherein the one or more destination elements are identified based on being reachable from a current location of the computing device within a predetermined amount of time.

14. The system of claim 10, wherein the operations further comprise:

based on the location history, predicting a route of the computing device, wherein the predicted location comprises a point on the predicted route of the computing device.

15. The system of claim 14, wherein the operations further comprise:

based on the predicted route, pre-fetching content likely to be retrieved by a user of the computing device.

16. The system of claim 10, wherein the operations further comprise:

identifying a speed of the computing device based on timestamps associated with the location history, wherein one or more of the trajectory-aware search results are based at least in part on the computed speed of the computing device.

17. The system of claim 10, wherein the operations further comprise:

identifying a speed of the computing device based on timestamps associated with the location history; and based on the speed being above a threshold, searching for results associated with one or more exits of a highway associated with the predicted location.

18. A storage medium storing instructions that, when executed by one or more hardware processors, causes the one or more hardware processors to perform operations comprising:

receiving, from a computing device, one or more search terms;

predicting a location based on a location history associated with the computing device, the predicting comprising:

identifying one or more destination elements in a geographic region;

determining probabilities that the one or more destination elements are a future location of the computing device; and identifying the predicted location based on the probabilities;

creating a trajectory-aware search query based on the one or more search terms and the predicted location;

triggering a search engine to perform a search using the trajectory-aware search query to obtain one or more trajectory-aware search results;

triggering the search engine to perform a search using a trajectory-unaware search query to obtain one or more trajectory-unaware search results, the trajectory-unaware query being based on the one or more search terms without the predicted location; and causing display of the one or more trajectory-unaware search results and the one or more trajectory-aware search results on the computing device, the trajectory-unaware search results being displayed visually different than the trajectory aware search results.

* * * * *